(12) United States Patent
Aisaka et al.

(10) Patent No.: US 8,548,247 B2
(45) Date of Patent: Oct. 1, 2013

(54) IMAGE PROCESSING APPARATUS AND METHOD, AND PROGRAM

(75) Inventors: Kazuki Aisaka, Kanagawa (JP); Masaya Kinoshita, Kanagawa (JP); Takashi Kameya, Kanagawa (JP); Jun Murayama, Tokyo (JP); Masatoshi Yokokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/002,958

(22) PCT Filed: May 6, 2010

(86) PCT No.: PCT/JP2010/057743
§ 371 (c)(1),
(2), (4) Date: Jan. 6, 2011

(87) PCT Pub. No.: WO2010/131593
PCT Pub. Date: Nov. 18, 2010

(65) Prior Publication Data
US 2012/0051650 A1    Mar. 1, 2012

(30) Foreign Application Priority Data
May 13, 2009    (JP) .................................. 2009-116096

(51) Int. Cl.
*G06K 9/46*    (2006.01)
*G06K 9/68*    (2006.01)

(52) U.S. Cl.
USPC ........................... 382/190; 382/195; 382/220

(58) Field of Classification Search
None
See application file for complete search history.

(56) References Cited

U.S. PATENT DOCUMENTS 6,512,846 B1 *   1/2003   Luo ............................... 382/165
6,654,506 B1 *  11/2003   Luo et al. ...................... 382/282
(Continued)

FOREIGN PATENT DOCUMENTS

JP    2002-245471    8/2002
JP    2010-055194    3/2010

OTHER PUBLICATIONS

International Search Report from the Japanese Patent Office for International Application No. PCT/JP2010/057743 (Mail date Jul. 6, 2010).

(Continued)

*Primary Examiner* — David Zarka
*Assistant Examiner* — Carol Wang
(74) *Attorney, Agent, or Firm* — Finnegan, Henderson, Farabow, Garrett & Dunner, L.L.P.

(57) ABSTRACT

The present invention relates to an image processing apparatus and method, and a program that make it possible to more accurately specify a photographic subject in an image.
A photographic subject map generating unit 21 generates, based on an input image, a photographic subject map indicating the likeliness of each region of the input image being a region of a photographic subject. A gradient map generating unit 22 generates a gradient map indicating the degree of change of the likeliness of the photographic subject map being a photographic subject. A threshold processing unit 23 and a threshold processing unit 24 binarize the gradient map using a high threshold THh and a low threshold TH1, and obtain threshold maps. A composite map generating unit 25 generates a composite map indicating the likeliness of each region of the input image being a photographic subject by regarding that, among regions specified as being likely to be a photographic subject based on the threshold map of the low threshold TH1, a region including a region specified as being likely to be a photographic subject based on the threshold map of the high threshold THh is a region of a photographic subject. The present invention is applicable to an image processing apparatus.

16 Claims, 17 Drawing Sheets

(56) References Cited

U.S. PATENT DOCUMENTS

| | | | |
|---|---|---|---|
| 7,212,668 B1* | 5/2007 | Luo et al. | 382/165 |
| 2002/0093670 A1* | 7/2002 | Luo et al. | 358/1.9 |
| 2004/0037460 A1* | 2/2004 | Luo et al. | 382/165 |
| 2004/0088726 A1* | 5/2004 | Ma et al. | 725/46 |
| 2008/0056534 A1* | 3/2008 | Kigasawa | 382/103 |

OTHER PUBLICATIONS

Itte et al., "Short Papers—A Model of Saliency-Based Visual Attention for Rapid Scene Analysis", IEEE, vol. 20, No. 11 (Nov. 1998).

* cited by examiner

IMAGE PROCESSING APPARATUS AND METHOD, AND PROGRAM

TECHNICAL FIELD

The present invention relates to an image processing apparatus and method, and a program, and more particularly to an image processing apparatus and method, and a program that make it possible to more accurately specify a region of a photographic subject in an image.

BACKGROUND ART

Hitherto, as a technique for specifying a region of a photographic subject in an image, the technique called visual attention has been known (for example, see Non Patent Literature 1).

In visual attention, luminance information, color information, and edge information are extracted from an input image that has been input, and information maps obtained based on these extracted items of information are added to generate one Saliency Map (hereinafter referred to as a photographic subject map).

This photographic subject map is information that indicates the likeliness of each region of the input image being a region of a photographic subject. That is, the pixel value of a pixel of the photographic subject map indicates the likeliness of a pixel (region) of the input image that is at the same position as that pixel being a region of a photographic subject. Therefore, in which region of the input image a photographic subject is included can be specified by using the photographic subject map.

CITATION LIST

Non Patent Literature

NPL 1: Laurent Itti, Christof Koch, and Ernst Niebur, "A Model of Saliency-Based Visual Attention for Rapid Scene Analysis"

SUMMARY OF INVENTION

Technical Problem

However, it is difficult for the above-described technique to more accurately specify a region of a photographic subject in an input image. Specifically, in the case where a region of a photographic subject in an input image is to be specified by using a photographic subject map, a region including, among pixels of the photographic subject map, pixels each having a pixel value that is greater than or equal to a predetermined threshold is regarded as a region of a photographic subject.

Therefore, depending on the threshold, a region that is not a photographic subject may be mistakenly detected as a region of a photographic subject owing to factors such as noise, or a region that should be regarded as a region of a photographic subject may not be detected as a region of a photographic subject. That is, in order to more accurately specify a region of a photographic subject, it is necessary to determine an appropriate threshold for each input image. However, determining an appropriate threshold is not easy to do.

The present invention has been made in view of these circumstances, and the present invention makes it possible to more accurately specify a region of a photographic subject in an image.

Solution to Problem

An image processing apparatus according to an aspect of the present invention includes: photographic subject map generating means for extracting, from an input image, a feature quantity of a feature included in a region of a photographic subject in the input image, and generating a photographic subject map that indicates the likeliness of each region of the input image being a region of the photographic subject; first threshold processing means for binarizing the photographic subject map by performing threshold processing using a first threshold, and generating a first threshold map for specifying a connected region including the photographic subject; second threshold processing means for binarizing the photographic subject map by performing threshold processing using a second threshold, and generating a second threshold map for specifying a region that is in the connected region specified based on the first threshold map and that is likely to be the photographic subject; and composite map generating means for generating a composite map for specifying a region of the photographic subject in the input image by regarding that, in one or a plurality of connected regions specified based on the first threshold map, the connected region including the region specified, based on the second threshold map, as the region that is likely to be the photographic subject is a region of the photographic subject.

The composite map generating means may generate the composite map by regarding that, in the connected region including the region specified, based on the second threshold map, as the region that is likely to be the photographic subject, the connected region having a predetermined area or greater is a region of the photographic subject.

The composite map is information in which binary information indicating whether each region of the input image is a region of the photographic subject is arranged corresponding to each region of the input image, and the image processing apparatus may further include photographic subject specifying information generating means for generating photographic subject specifying information that specifies a region of the photographic subject in the input image by obtaining an AND of the composite map and the photographic subject map and binarizing an arithmetic result of the AND by performing threshold processing using a third threshold.

The photographic subject specifying information generating means may obtain the third threshold, in the arithmetic result of the AND, based on the photographic subject map, for each region that is the same as a photographic subject region specified, based on the composite map, as a region of the photographic subject.

The image processing apparatus may further include gradient map generating means for generating, based on the photographic subject map, a gradient map indicating the degree of change of the likeliness of each region of the input image being a region of the photographic subject indicated by the photographic subject map, and the first threshold processing means and the second threshold processing means may perform threshold processing of the gradient map, and generate the first threshold map and the second threshold map.

The first threshold processing means and the second threshold processing means may calculate the first threshold and the second threshold based on the gradient map.

An information processing method or a program according to an aspect of the present invention includes the steps of: extracting, from an input image, a feature quantity of a feature included in a region of a photographic subject in the input image, and generating a photographic subject map that indicates the likeliness of each region of the input image being a region of the photographic subject; binarizing the photographic subject map by performing threshold processing using a first threshold, and generating a first threshold map for specifying a connected region including the photographic subject; binarizing the photographic subject map by performing threshold processing using a second threshold, and generating a second threshold map for specifying a region that is in the connected region specified based on the first threshold map and that is likely to be the photographic subject; and generating a composite map for specifying a region of the photographic subject in the input image by regarding that, in one or a plurality of connected regions specified based on the first threshold map, the connected region including the region specified, based on the second threshold map, as the region that is likely to be the photographic subject is a region of the photographic subject.

According to an aspect of the present invention, a feature quantity of a feature included in a region of a photographic subject in an input image is extracted from the input image, and a photographic subject map that indicates the likeliness of each region of the input image being a region of the photographic subject is generated. The photographic subject map is binarized by performing threshold processing using a first threshold, and a first threshold map for specifying a connected region including the photographic subject is generated. The photographic subject map is binarized by performing threshold processing using a second threshold, and a second threshold map for specifying a region that is in the connected region specified based on the first threshold map and that is likely to be the photographic subject is generated. A composite map for specifying a region of the photographic subject in the input image is generated by regarding that, in one or a plurality of connected regions specified based on the first threshold map, the connected region including the region specified, based on the second threshold map, as the region that is likely to be the photographic subject is a region of the photographic subject.

Advantageous Effects of Invention

According to an aspect of the present invention, a region of a photographic subject in an image can be more accurately specified.

DESCRIPTION OF EMBODIMENTS

Hereinafter, embodiments according to the present invention will be described with reference to the drawings.
[Configuration of Image Processing Apparatus]

Figure 1:
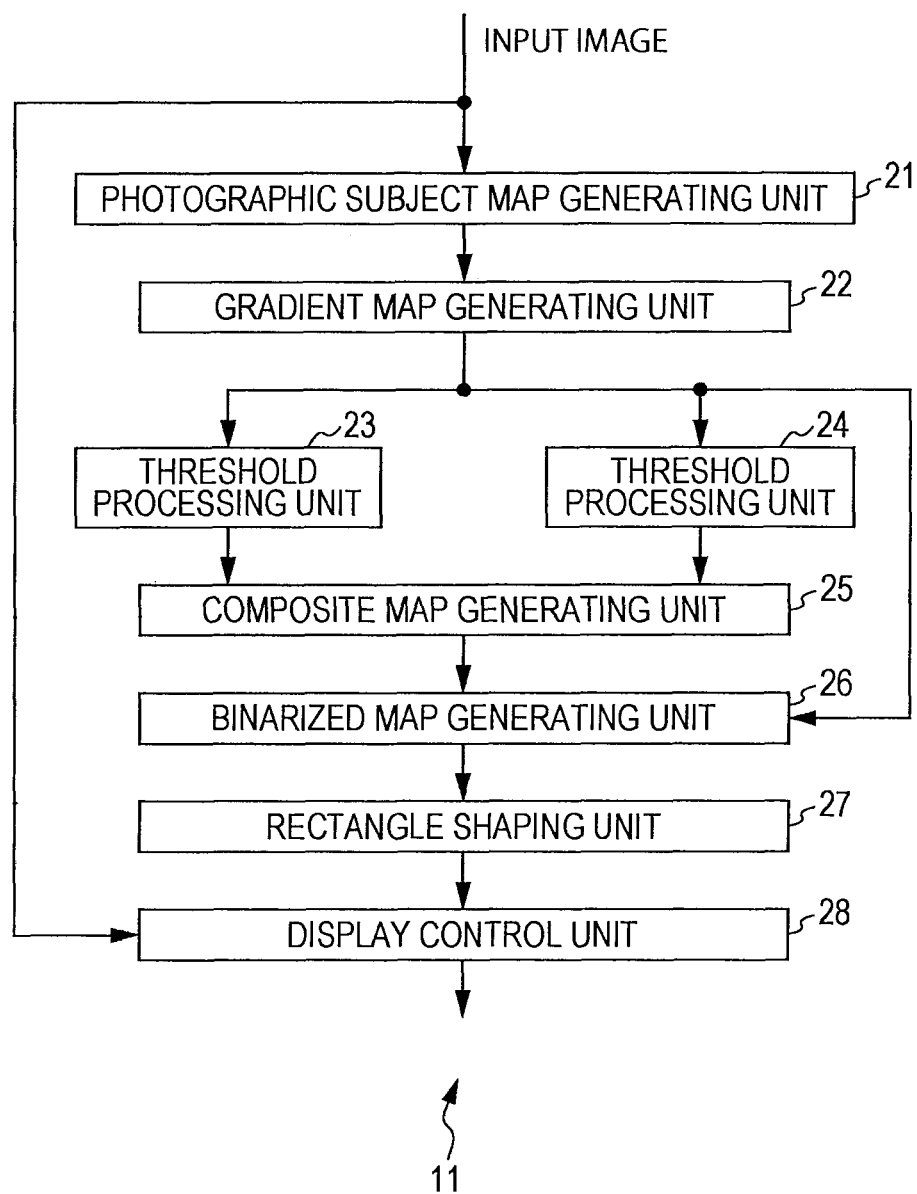
FIG. 1 is a block diagram illustrating an example of the configuration of an embodiment of an image processing apparatus according to the present invention.

FIG. 1 is a block diagram illustrating an example of the configuration of an embodiment of an image processing apparatus according to the present invention.

An image processing apparatus 11 is mounted on an image capturing apparatus such as a camera, specifies a region of a photographic subject in an input image that has been captured, and displays a frame surrounding the region of the photographic subject together with the input image. Note that, hereinafter, a region of a photographic subject in an input image may also be called a photographic subject region, and a frame surrounding a photographic subject region displayed on an input image may also be called a photographic subject frame.

The image processing apparatus 11 is constructed of a photographic subject map generating unit 21, a gradient map generating unit 22, a threshold processing unit 23, a threshold processing unit 23, a composite map generating unit 25, a binarized map generating unit 26, a rectangle shaping unit 27, and a display control unit 28. In the image processing apparatus 11, an input image that has been captured is supplied to the photographic subject map generating unit 21 and the display control unit 28.

The photographic subject map generating unit 21 generates, based on the supplied input image, a photographic subject map that is information indicating the likeliness of each region of the input image being a region including a photographic subject, and supplies the photographic subject map to the gradient map generating unit 22. Here, the photographic subject is, in the case where a user glances at the input image, an object in the input image that is estimated to draw attention of the user, that is, an object estimated to capture the eyes of the user. Therefore, the photographic subject is not necessarily restricted to a person.

The gradient map generating unit 22 extracts, from the photographic subject map supplied from the photographic subject map generating unit 21, an edge portion of the likeliness of being a photographic subject, and generates a gradient map indicating the magnitude of the edge (edge intensity). Here, the edge portion of the likeliness of being a photographic subject is a region in which a value that indicates the likeliness of the photographic subject map being a photographic subject, that is, the pixel value of a pixel of the photographic subject, suddenly changes. Therefore, the pixel value of each pixel of the gradient map indicates the degree of change of the pixel value (value that indicates the likeliness of being a photographic subject) in the photographic subject map.

The gradient map generating unit 22 supplies the generated gradient map to the threshold processing unit 23, the threshold processing unit 24, and the binarized map generating unit 26.

The threshold processing unit 23 and the threshold processing unit 24 obtain, using the gradient map supplied from the gradient map generating unit 22, thresholds used for extracting, from the gradient map, a region that is likely to be a photographic subject in the input image. Note that the threshold processing unit 23 and the threshold processing unit 24 obtain different thresholds.

Also, the threshold processing unit 23 and the threshold processing unit 24 binarize the gradient map by performing threshold processing using the obtained thresholds, generate threshold maps each indicating a region including a photographic subject in the input image, and supply the generated threshold maps to the composite map generating unit 25. Here, in the threshold maps, regions that are regarded as regions including a photographic subject in the input image are regions in which the pixel value of a pixel of the gradient map is greater than or equal to the thresholds.

The composite map generating unit 25 generates a composite map by using the threshold maps supplied from the threshold processing unit 23 and the threshold processing unit 24, and supplies the composite map to the binarized map generating unit 26.

For example, the composite map generating unit 25 regards, in either of the two threshold maps, one region obtained by connecting adjacent regions (pixels) that are regarded as regions including a photographic subject as a connected region. The composite map generating unit 25 regards, of the connected region, information indicating, in the two threshold maps, the connected region indicating a region that is regarded as a region including a photographic subject as a composite map.

The binarized map generating unit 26 generates a binarized map by using the gradient map supplied from the gradient map generating unit 22 and the composite map supplied from the composite map generating unit 25, and supplies the binarized map to the rectangle shaping unit 27. Here, the binarized map is information indicating a region in which, in a region in the connected region indicated by the composite map, the pixel value of a pixel of the gradient map corresponding to that region is greater than or equal to a certain threshold.

The rectangle shaping unit 27 regards a rectangular region including the region indicated by the binarized map supplied from the binarized map generating unit 26 as a photographic subject region including a photographic subject, and supplies photographic subject region information indicating the photographic subject region to the display control unit 28. The display control unit 28 controls a display unit that is not illustrated based on the supplied input image and the photographic subject region information from the rectangle shaping unit 27, and displays the input image on which the photographic subject frame is displayed on the display unit.

Figure 2:
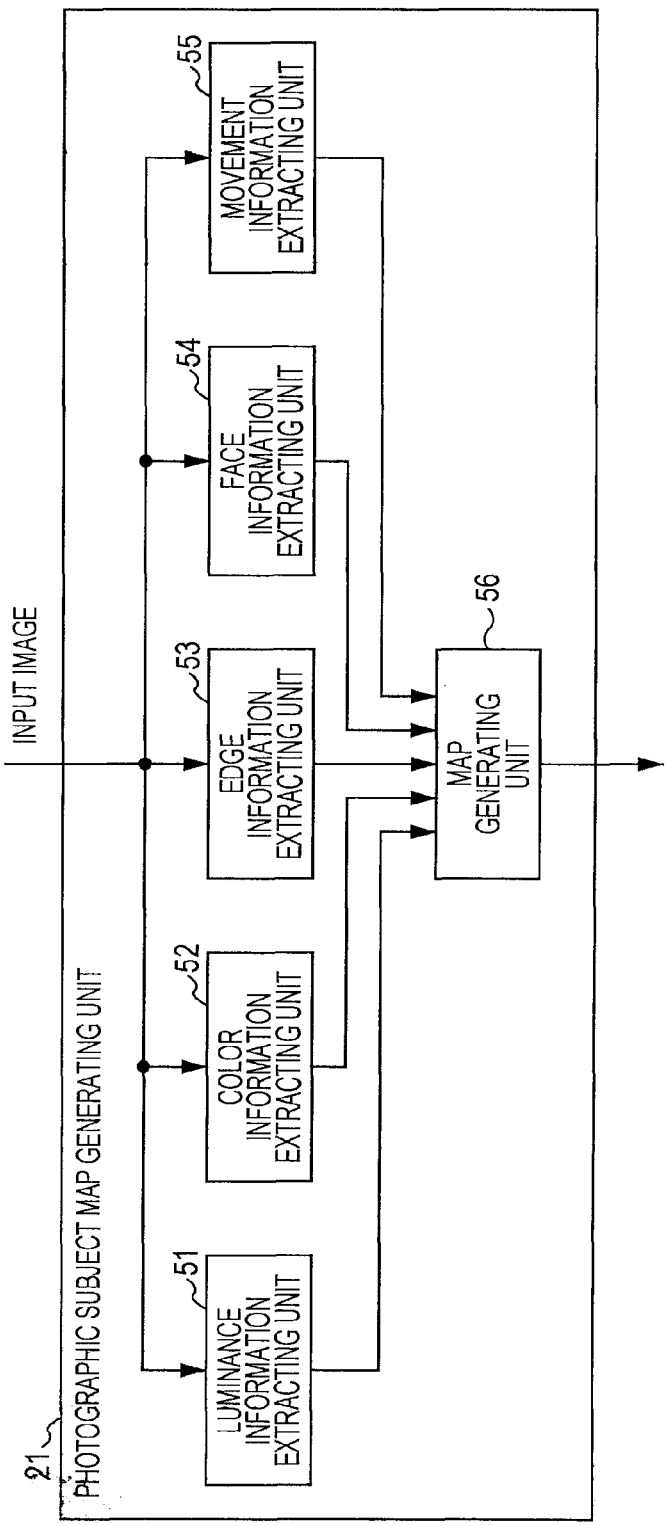
FIG. 2 is a diagram illustrating an example of the configuration of a photographic subject map generating unit.

Also, more specifically, the photographic subject map generating unit 21 in FIG. 1 is constructed as illustrated in FIG. 2.

That is, the photographic subject map generating unit 21 is constructed of a luminance information extracting unit 51, a color information extracting unit 52, an edge information extracting unit 53, a face information extracting unit 54, a movement information extracting unit 55, and a map generating unit 56.

The luminance information extracting unit 51 generates, based on the supplied input image, a luminance information map indicating information regarding luminance in each region of the input image, and supplies the luminance information map to the map generating unit 56. The color information extracting unit 52 generates, based on the supplied input image, a color information map indicating information regarding color in each region of the input image, and supplies the color information map to the map generating unit 56.

The edge information extracting unit 53 generates, based on the supplied input image, an edge information map indicating information regarding edge in each region of the input image, and supplies the edge information map to the map generating unit 56. The face information extracting unit 54 generates, based on the supplied input image, a face information map indicating information regarding the face of a person serving as a photographic subject in each region of the input image, and supplies the face information map to the map generating unit 56. The movement information extracting unit 55 generates, based on the supplied input image, a movement information map indicating information regarding movement in each region of the input image, and supplies the movement information map to the map generating unit 56.

Note that, hereinafter, in the case where it is unnecessary to distinguish among the luminance information map to the movement information map output from the luminance information extracting unit 51 to the movement information extracting unit 55, they are also simply referred to as information maps. Information included in these information maps is regarded as information indicating feature quantities of features more of which are included in a region including a photographic subject, and a thing in which that information is arranged corresponding to each region of the input image is regarded as an information map.

That is, the luminance information extracting unit 51 to the movement information extracting unit 55 extract, from the input image, feature quantities of features more of which are included in a region of a photographic subject, and generate information maps that are items of information indicating feature quantities in each region of the input image. Therefore, a region that has a greater amount of information, that is, a region of the input image corresponding to a region that has a great amount of information, in each information map is a region that is more highly likely to include a photographic subject, and a region including a photographic subject in the input image can be specified based on each information map.

The map generating unit 56 linearly combines the luminance information map, the color information map, the edge information map, the face information map, and the movement information map supplied from the luminance information extracting unit 51 to the movement information extracting unit 55, and generates a photographic subject map. That is, items of information (feature quantities) in each region of the luminance information map to the movement information map are weighted-added according to each region at the same position, thereby generating a photographic subject map. The map generating unit 56 supplies the generated photographic subject map to the gradient map generating unit 22.

Next, with reference to FIG. 3 to FIG. 7, the more detailed configuration of the luminance information extracting unit 51 to the movement information extracting unit 55 in FIG. 2 will be described.

Figure 3:
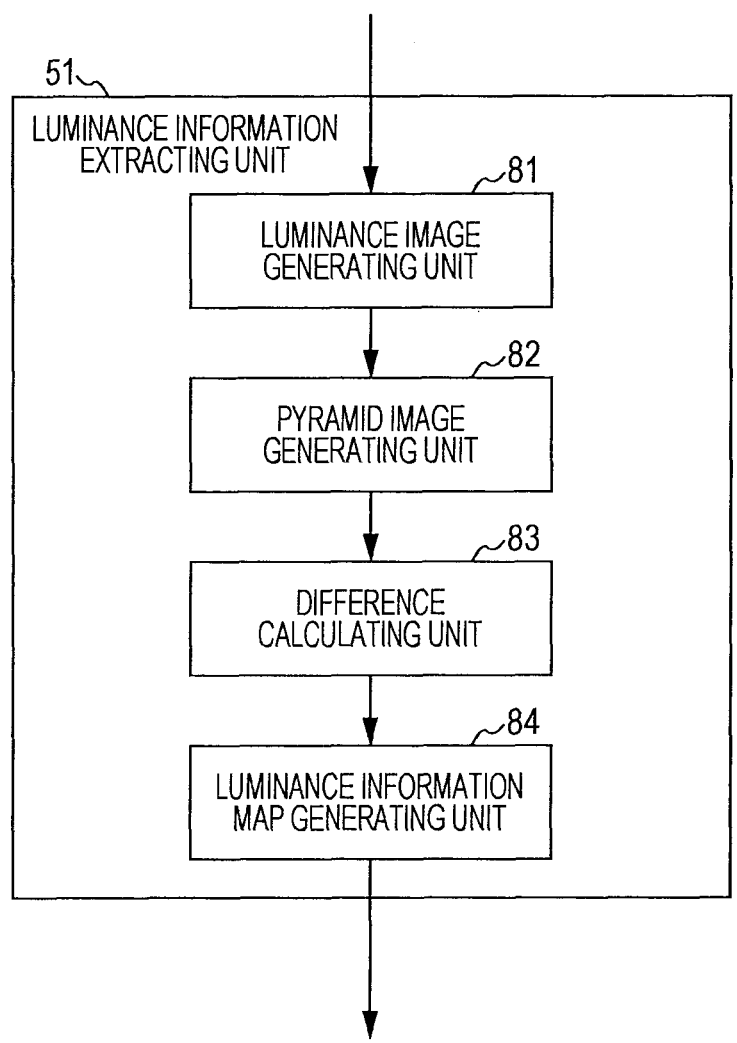
FIG. 3 is a diagram illustrating an example of the configuration of a luminance information extracting unit.

FIG. 3 is a diagram illustrating an example of the more detailed configuration of the luminance information extracting unit 51.

The luminance information extracting unit 51 is constructed of a luminance image generating unit 81, a pyramid image generating unit 82, a difference calculating unit 83, and a luminance information map generating unit 84.

The luminance image generating unit 81 generates, using the supplied input image, a luminance image in which the luminance value of a pixel of the input image serves as the pixel value of a pixel, and supplies the luminance image to the pyramid image generating unit 82. Here, the pixel value of an arbitrary pixel of the luminance image indicates the luminance value of a pixel of the input image that is at the same position as that pixel.

The pyramid image generating unit 82 generates, using the luminance image supplied from the luminance image generating unit 81, a plurality of luminance images with different resolutions, and supplies these luminance images as luminance pyramid images to the difference calculating unit 83.

For example, pyramid images in layers with eight resolutions from level L1 to level L8 are generated. It is assumed that the pyramid image at level L1 has the highest resolution, and the resolutions of the pyramid images decrease in the order from level L1 to level L8.

In this case, the luminance image generated by the luminance image generating unit 81 serves as the pyramid image at level L1. Also, the average value of the pixel values of four adjacent pixels of a pyramid image at level Li (note that $1 \leq i \leq 7$) serves as the pixel value of one pixel of a pyramid image at level L(i+1) corresponding to these pixels. Therefore, the pyramid image at level L(i+1) is an image that is vertically and horizontally reduced to half (rounded down when not divisible) with respect to the pyramid image at level Li.

The difference calculating unit 83 selects, from among the plurality of pyramid images supplied from the pyramid image generating unit 82, two pyramid images in different layers, obtains the differences between the selected pyramid images, and generates a luminance difference image. Note that, since the pyramid images in the individual layers have different sizes (numbers of pixels), at the time of generation of a difference image, the smaller pyramid image is up-converted in accordance with the larger pyramid image.

When the difference calculating unit 83 generates a predetermined number of luminance difference images, the difference calculating unit 83 normalizes these generated difference images, and supplies the normalized difference images to the luminance information map generating unit 84. The luminance information map generating unit 84 generates a luminance information map based on the difference images supplied from the difference calculating unit 83, and supplies the luminance information map to the map generating unit 56.

Figure 4:
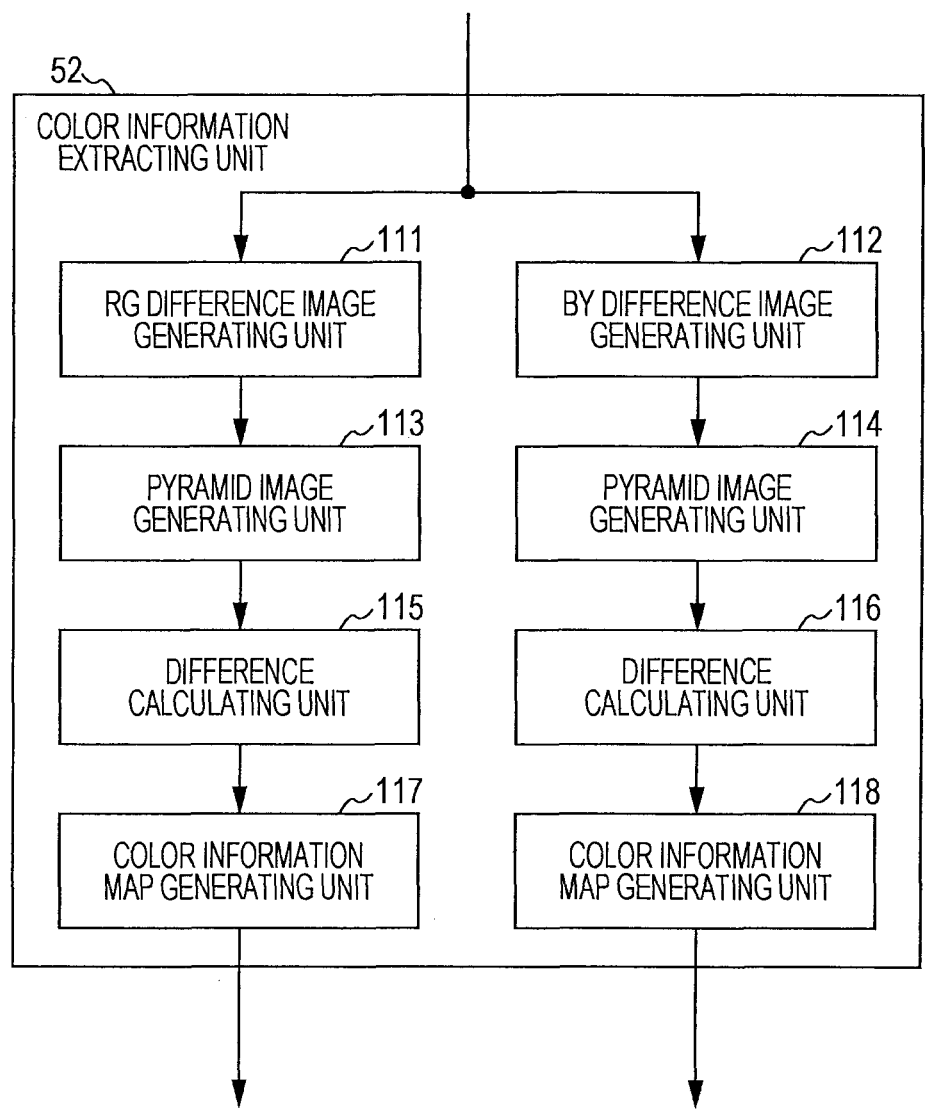
FIG. 4 is a diagram illustrating an example of the configuration of a color information extracting unit.

FIG. 4 is a diagram illustrating an example of the more detailed configuration of the color information extracting unit 52 in FIG. 2.

The color information extracting unit 52 is constructed of an RG difference image generating unit 111, a BY difference image generating unit 112, a pyramid image generating unit 113, a pyramid image generating unit 114, a difference calculating unit 115, a difference calculating unit 116, a color information map generating unit 117, and a color information map generating unit 118.

The RG difference image generating unit 111 generates, using the supplied input image, an RG difference image in which the difference between the R (red) component and the G (green) component of a pixel of the input image serves as the pixel value of a pixel, and supplies the RG difference image to the pyramid image generating unit 113. The pixel value of an arbitrary pixel of the RG difference image indicates the value of the difference between the R component and the G component of a pixel of the input image that is at the same position as that pixel.

The BY difference image generating unit 112 generates, using the supplied input image, a BY difference image in which the difference between the B (blue) component and the Y (yellow) component of a pixel of the input image serves as the pixel value of a pixel, and supplies the BY difference image to the pyramid image generating unit 114. The pixel value of an arbitrary pixel of the BY difference image indicates the value of the difference between the B (blue) component and the Y (yellow) component of a pixel of the input image that is at the same position as that pixel.

The pyramid image generating unit 113 and the pyramid image generating unit 114 generate, using the RG difference image and the BY difference image supplied from the RG difference image generating unit 111 and the BY difference image generating unit 112, a plurality of RG difference images and BY difference images with different resolutions. The pyramid image generating unit 113 and the pyramid image generating unit 114 regard these generated RG difference images and BY difference images as RG-difference pyramid images and BY-difference pyramid images, and supply the RG-difference pyramid images and the BY-difference pyramid images to the difference calculating unit 115 and the difference calculating unit 116.

For example, as in the case with the luminance pyramid images, pyramid images in layers with eight resolutions from level L1 to level L8 are respectively generated as the RG-difference pyramid images and the BY-difference pyramid images.

The difference calculating unit 115 and the difference calculating unit 116 select, from among the plurality of pyramid images supplied from the pyramid image generating unit 113 and the pyramid image generating unit 114, two pyramid imagers in different layers, obtain the differences between the selected pyramid images, and generate an RG-difference difference image and a BY-difference difference image. Note that, since the pyramid images in the individual layers have different sizes, at the time of generation of a difference image, the smaller pyramid image is up-converted to be the same size as the larger pyramid image.

When the difference calculating unit 115 and the difference calculating unit 116 generate a predetermined number of RG-difference difference images and BY-difference difference images, the difference calculating unit 115 and the difference calculating unit 116 normalize these generated difference images, and supply the normalized difference images to the color information map generating unit 117 and the color information map generating unit 118. The color information map generating unit 117 and the color information map generating unit 118 generate color information maps based on the difference images supplied from the difference calculating unit 115 and the difference calculating unit 116, and supply the color information maps to the map generating unit 56. In the color information map generating unit 117, an RG-difference color information map is generated. In the color information map generating unit 118, a BY-difference color information map is generated.

Figure 5:
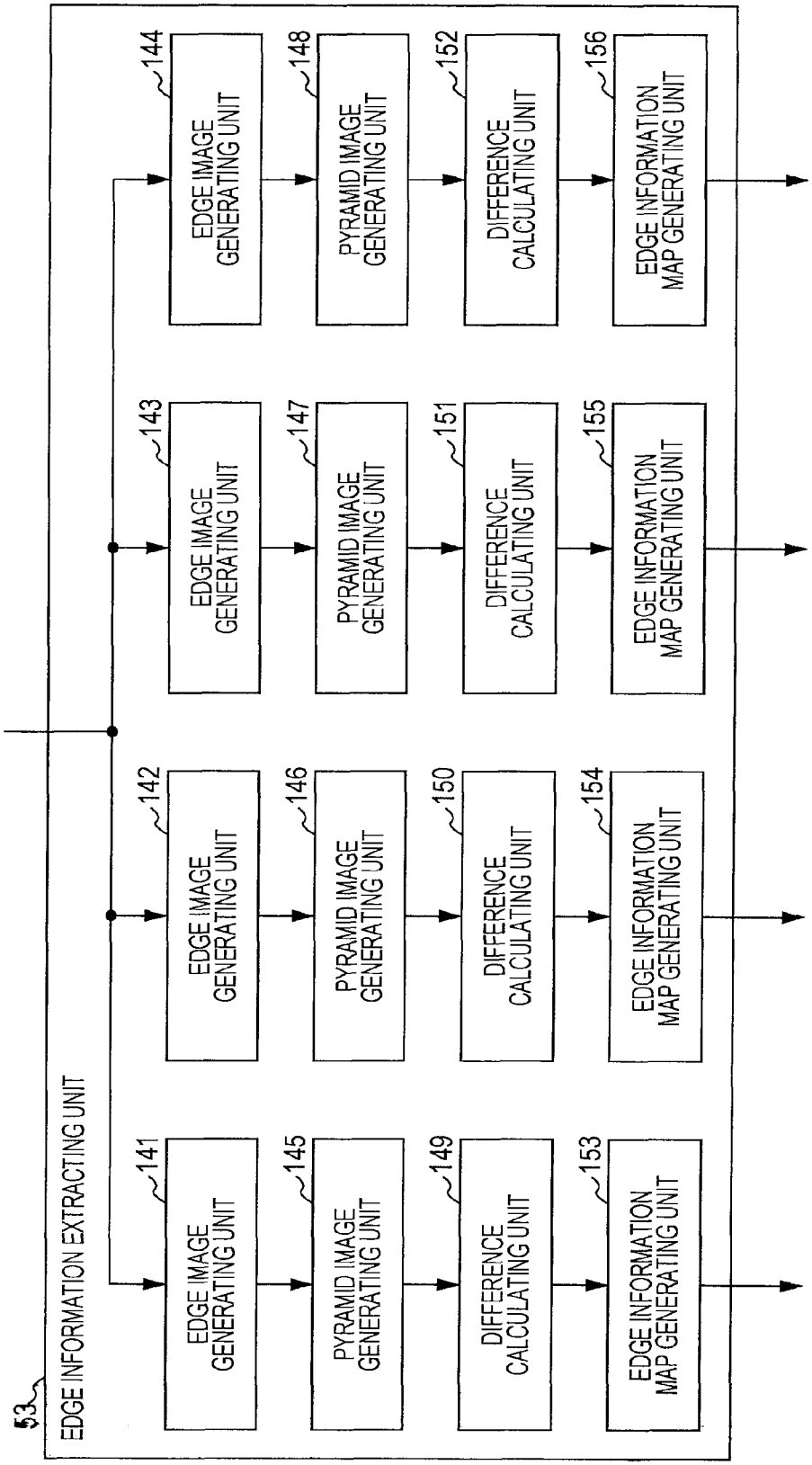
FIG. 5 is a diagram illustrating an example of the configuration of an edge information extracting unit.

FIG. 5 is a diagram illustrating an example of the more detailed configuration of the edge information extracting unit 53 in FIG. 2.

The edge information extracting unit 53 is constructed of an edge image generating unit 141 to an edge image generating unit 144, a pyramid image generating unit 145 to a pyramid image generating unit 148, a difference calculating unit 149 to a difference calculating unit 152, and an edge information map generating unit 153 and an edge information map generating unit 156.

The edge image generating unit 141 to the edge image generating unit 144 apply a filtering process using a Gabor filter to the supplied input image, generate edge images in which, for example, edge intensities in orientations of 0 degrees, 45 degrees, 90 degrees, and 135 degrees serve as the pixel values of pixels, and supply the edge images to the pyramid image generating unit 145 to the pyramid image generating unit 148.

For example, the pixel value of an arbitrary pixel of the edge image generated by the edge image generating unit 141 indicates the edge intensity in an orientation of 0 degrees of a pixel of the input image that is at the same position as that pixel. Note that the orientation of each edge means an orientation indicated by an angle component of a Gabor function constituting the Gabor filter.

The pyramid image generating unit 145 to the pyramid image generating unit 148 generate, using the edge images in the respective orientations supplied from the edge image generating unit 141 to the edge image generating unit 144, a plurality of edge images with different resolutions. The pyramid image generating unit 145 to the pyramid image generating unit 148 regard the generated edge images in the respective orientations as pyramid images of the edges' respective orientations, and supply the pyramid images of the edges' respective orientations to the difference calculating unit 149 to the difference calculating unit 152.

For example, as in the case with the luminance pyramid images, pyramid images in eight layers from level L1 to level L8 are individually generated as the pyramid images of the edges' respective orientations.

The difference calculating unit 149 to the difference calculating unit 152 respectively select, from among the plurality of pyramid images supplied from the pyramid image generating unit 145 to the pyramid image generating unit 148, two pyramid imagers in different layers, obtain the differences between the selected pyramid images, and generate difference images in the edges' respective orientations. Note that, since the pyramid images in the individual layers have different sizes, at the time of generation of a difference image, the smaller pyramid image is up-converted.

When the difference calculating unit 149 to the difference calculating unit 152 generate a predetermined number of difference images in the edges' respective orientations, the difference calculating unit 149 to the difference calculating unit 152 normalize these generated difference images, and supply the normalized difference images to the edge information map generating unit 153 to the edge information map generating unit 156. The edge information map generating unit 153 to the edge information map generating unit 156 generate edge information maps in the respective orientations based on the difference images supplied from the difference calculating unit 149 to the difference calculating unit 152, and supply the edge information maps in the respective orientations to the map generating unit 56.

Figure 6:
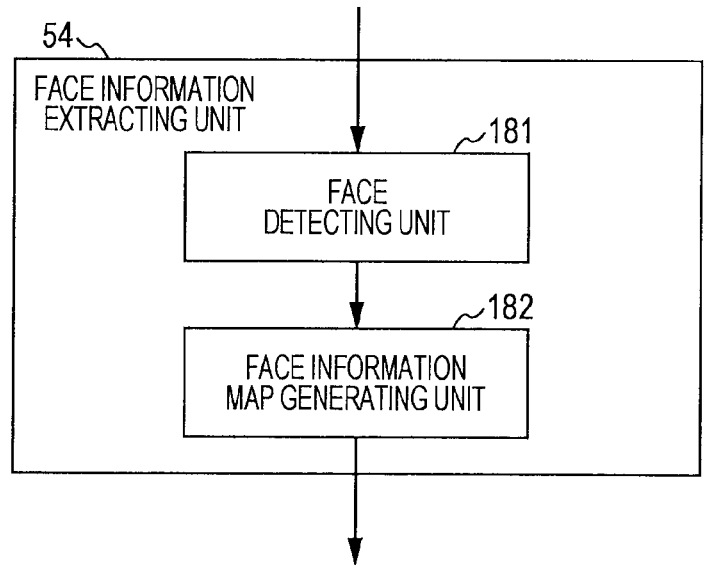
FIG. 6 is a diagram illustrating an example of the configuration of a face information extracting unit.

FIG. 6 is a diagram illustrating an example of the more detailed configuration of the face information extracting unit 54 in FIG. 2.

The face information extracting unit 54 is constructed of a face detecting unit 181 and a face information map generating unit 182.

The face detecting unit 181 detects, in the supplied input image, a region of the face of a person as a photographic subject, and supplies the detection result to the face information map generating unit 182. The face information map generating unit 182 generates a face information map based on the detection result from the face detecting unit 181, and supplies the face information map to the map generating unit 56.

Figure 7:
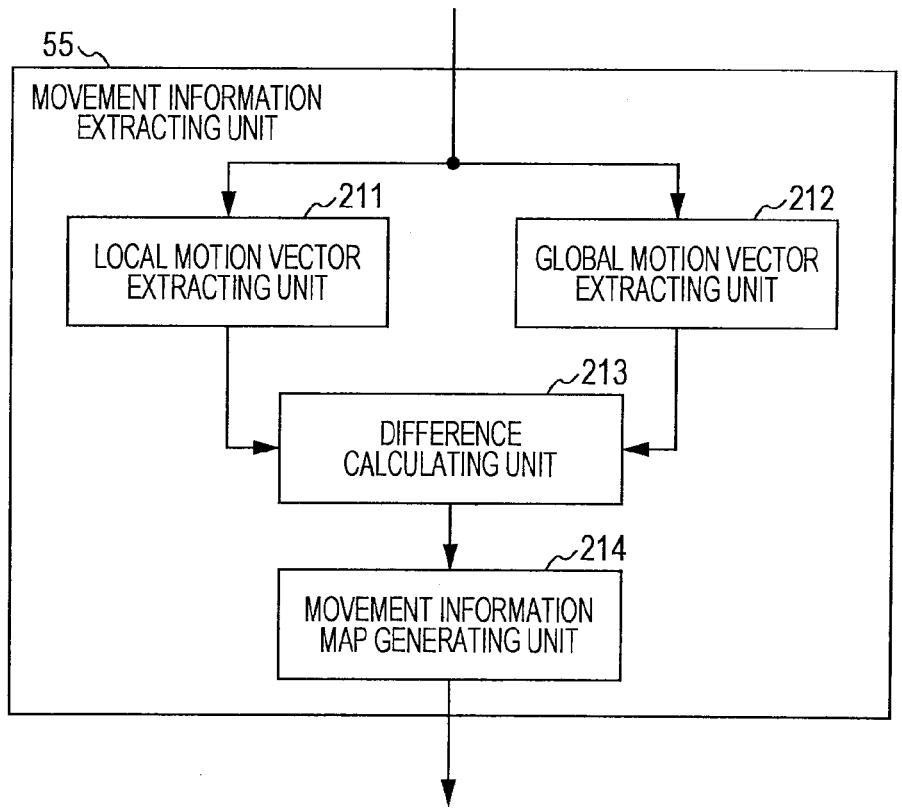
FIG. 7 is a diagram illustrating an example of the configuration of a movement information extracting unit.

FIG. 7 is a diagram illustrating an example of the more detailed configuration of the movement information extracting unit 55 in FIG. 2.

The movement information extracting unit 55 is constructed of a local motion vector extracting unit 211, a global motion vector extracting unit 212, a difference calculating unit 213, and a movement information map generating unit 214.

The local motion vector extracting unit 211 detects, using the supplied input image and another input image whose image capturing time is different from the input image, a movement vector of each pixel of the input image as a local motion vector, and supplies the local motion vector to the difference calculating unit 213. The global motion vector extracting unit 212 detects, using the supplied input image and another input image whose image capturing time is different from the input image, a movement vector of each pixel of the input image, further obtains the average value of movement vectors of the individual pixels as a global motion vector, and supplies the global motion vector to the difference calculating unit 213. The global motion vector indicates the direction of movement of the entire input image.

The difference calculating unit 213 obtains the absolute value of the difference between the local motion vector from the local motion vector extracting unit 211 and the global motion vector from the global motion vector extracting unit 212 to generate a movement difference image, and supplies the movement difference image to the movement information map generating unit 214. Here, the pixel value of an arbitrary pixel of the movement difference image indicates the absolute value of the difference between the local motion vector of a pixel of the input image that is at the same position as that pixel and the global motion vector of the entire input image. Therefore, the pixel value of a pixel of the movement difference image indicates the relative movement amount with respect to the entire input image of an object (or background) displayed at the pixel of the input image, that is, with respect to the background.

The movement information map generating unit 214 generates a movement information map based on the movement difference image from the difference calculating unit 213, and supplies the movement information map to the map generating unit 56. Note that, more specifically, generation of a movement information map is performed in the case where items that have been temporally consecutively captured are supplied as input images, such as in the case where input images have been continuously captured or an input image is a moving image.

[Operation of Image Processing Apparatus]

By the way, when an input image is supplied to the image processing apparatus 11, the image processing apparatus 11 specifies a photographic subject region in the input image, and starts a photographic subject frame displaying process of displaying a photographic subject frame on the input image. Hereinafter, with reference to the flowchart in FIG. 8, a photographic subject frame displaying process performed by the image processing apparatus 11 will be described.

In step S11, the photographic subject map generating unit 21 performs a photographic subject map generating process to generate a photographic subject map based on the supplied input image. Also, in step S12, the image processing apparatus 11 performs a photographic subject region extracting process to specify a photographic subject region based on the generated photographic subject map. When the photographic subject region is specified, the rectangle shaping unit 27 supplies photographic subject region information indicating that photographic subject region to the display control unit 28.

Note that details of the photographic subject map generating process and the photographic subject region extracting process will be described later.

In step S13, the display control unit 28 displays a photographic subject frame on the input image, based on the supplied input image and the photographic subject region information from the rectangle shaping unit 27, and the photographic subject frame displaying process ends. That is, the display control unit 28 supplies the input image to a display unit that is not illustrated so that the input image is displayed, and, further, based on the photographic subject region information, displays a photographic subject frame on the input image.

In this manner, the image processing apparatus 11 generates a photographic subject map based on the input image, further specifies a photographic subject region based on the photographic subject map, and displays a photographic subject frame on the input image.

Next, with reference to the flowchart in FIG. 9, the photographic subject map generating process corresponding to processing in step S11 of FIG. 8 will be described.

In step S41, the luminance information extracting unit 51 performs a luminance information extracting process to generate a luminance information map based on the supplied input image, and supplies the luminance information map to the map generating unit 56. In step S42, the color information extracting unit 52 performs a color information extracting process to generate a color information map based on the supplied input image, and supplies the color information map to the map generating unit 56.

In step S43, the edge information extracting unit 53 performs an edge information extracting process to generate an edge information map based on the supplied input image, and supplies the edge information map to the map generating unit 56. Also, in step S44, the face information extracting unit 54 performs a face information extracting process to generate a face information map based on the supplied input image, and supplies the face information map to the map generating unit 56. Further, in step S45, the movement information extracting unit 55 performs a movement information extracting process to generate a movement information map based on the supplied input image, and supplies the movement information map to the map generating unit 56.

Note that details of these luminance information extracting process, color information extracting process, edge information extracting process, face information extracting process, and movement information extracting process will be described later. Also, more specifically, the movement information extracting process is not performed in the case where no input images that have been temporally consecutively captured are supplied to the photographic subject map generating unit 21.

In step S46, the map generating unit 56 generates a photographic subject map using the luminance information map to the movement information map supplied from the luminance information extracting unit 51 to the movement information extracting unit 55, and supplies the photographic subject map to the gradient map generating unit 22.

For example, the map generating unit 56 linearly combines the individual information maps using information weights Wb that are weights obtained in advance for the individual information maps, performs normalization by multiplying a pixel value of the map obtained as a result thereof by a photographic subject weight Wc that is a weight obtained in advance, thereby generating a photographic subject map.

That is, when it is assumed that a pixel to which attention is paid on a photographic subject map to be obtained serves as an attended pixel, the pixel values of pixels of the individual information maps that are at the same position as the attended pixel are multiplied by the information weights Wb for the individual information maps, and the sum total of the pixel values multiplied by the information weights Wb serves as the pixel value of the attended pixel. Further, normalization is performed by multiplying the pixel value of each pixel of the photographic subject map obtained in this manner by a photographic subject weight Wc obtained in advance for the photographic subject map, thereby generating a final photographic subject map.

Note that, more specifically, a photographic subject map is generated using the RG-difference color information map and the BY-difference color information map as color information maps, and the edge information maps in respective orientations of 0 degrees, 45 degrees, 90 degrees, and 135 degrees as edge information maps. Also, the photographic subject weight Wc is obtained in advance by learning, and normalization is performed so that the pixel value of each pixel of the photographic subject map takes a value between 0 and 1.

Figure 8:
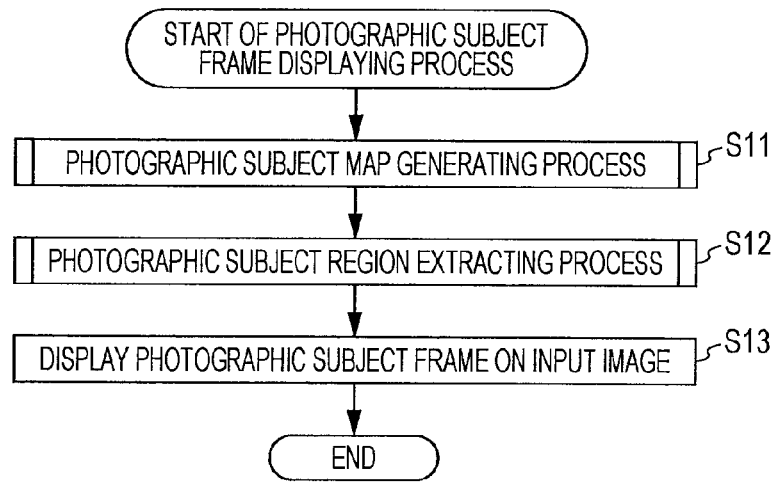
FIG. 8 is a flowchart describing a photographic subject frame displaying process.

When the photographic subject map is generated in this manner, the photographic subject map generating process ends, and thereafter the process proceeds to step S12 of FIG. 8.

As above, the photographic subject map generating unit 21 extracts feature quantities of the individual features from the supplied input image, and generates information maps. The photographic subject map generating unit 21 generates a photographic subject map based on the generated individual information maps.

Next, with reference to the flowcharts in FIG. 10 to FIG. 14, the processes respectively corresponding to processing in step S41 to step S45 of FIG. 9 will be described.

First, with reference to the flowchart in FIG. 10, the luminance information extracting process corresponding to processing in step S41 of FIG. 9 will be described.

In step S71, the luminance image generating unit 81 generates a luminance image using the supplied input image, and supplies the luminance image to the pyramid image generating unit 82. For example, the luminance image generating unit 81 multiplies the value of each component R, G, and B of a pixel of the input image by a coefficient obtained in advance for each component, and obtains the sum of the values of the individual components multiplied by the coefficients as the pixel value of a pixel of a luminance image that is at the same position as the pixel of the input image. That is, of a component signal including a luminance component (Y) and chrominance components (Cb, Cr), the luminance component is obtained. Note that, alternatively, the average value of the values of the individual components R, G, and B of a pixel may serve as the pixel value of a pixel of a luminance image.

In step S72, the pyramid image generating unit 82 generates pyramid images in individual layers from level L1 to level L8 based on the luminance image supplied from the luminance image generating unit 81, and supplies the pyramid images to the difference calculating unit 83.

In step S72, the difference calculating unit 83 generates difference images using the pyramid images supplied from the pyramid image generating unit 82, normalizes the difference images, and supplies the normalized difference images to the luminance information map generating unit 84. Normalization is performed so that the pixel value of a pixel of a difference image takes a value between, for example, 0 and 255.

Specifically, the difference calculating unit 83 obtains the difference between pyramid images included in combinations of the individual layers of level L6 and level L3, level L7 and level L3, level L7 and level L4, level L8 and level L4, and level L8 and level L5. Accordingly, five luminance difference images in total are obtained.

For example, in the case where a difference image of a combination of level L6 and level L3 is to be generated, the pyramid image at level L6 is up-converted in accordance with the size of the pyramid image at level L3. That is, the pixel value of a pixel of the pyramid image at level L6 before up-conversion serves as the pixel value of a few adjacent pixels, corresponding to that pixel, of the pyramid image at level L6 after up-conversion. The difference between the pixel value of a pixel of the pyramid image at level L6 and the pixel value of a pixel of the pyramid image at level L3 that is at the same position as that pixel is obtained, and that difference serves as the pixel value of a pixel of a difference image.

The process of generating these difference images is equivalent to applying a filtering process to a luminance image using a band-pass filter and extracting a certain frequency component from the luminance image. The pixel value of a pixel of a difference image obtained in this manner indicates the difference between luminance values of the pyramid images at individual levels, that is, the difference between the luminance of a certain pixel of the input image and the average luminance around that pixel.

In general, a region of an image where a luminance difference from the surroundings is great is a striking region that draws attention of a person who sees that image. Thus, that region is highly likely to be a region of a photographic subject. Therefore, it can be said that, in each difference image, a pixel with a greater pixel value indicates a region that is highly likely to be a region of a photographic subject.

In step S74, the luminance information map generating unit 84 generates a luminance information map based on the difference images supplied from the difference calculating unit 83, and supplies the luminance information map to the map generating unit 56. When the luminance information map is supplied from the luminance information map generating unit 84 to the map generating unit 56, the luminance information extracting process ends, and the process proceeds to step S42 of FIG. 9.

For example, the luminance information map generating unit 84 performs weighted addition of the supplied five difference images using difference weights Wa that are weights obtained in advance for the individual difference images, and obtains a single image. That is, the pixel values of pixels of the individual difference images that are at the same position are multiplied by the respective difference weights Wa, and the sum total of the pixel values multiplied by the difference weights Wa is obtained.

Note that, at the time of generation of a luminance information map, up-conversion of the difference images is performed so that the individual difference images will have the same size.

In this manner, the luminance information extracting unit 51 obtains a luminance image based on the input image, and generates a luminance information map based on the luminance image. According to the luminance information map obtained in this manner, in the input image, a region where a luminance difference is great, that is, a region that is likely to draw attention of an observer who glances at the input image, can be easily detected.

Figure 11:
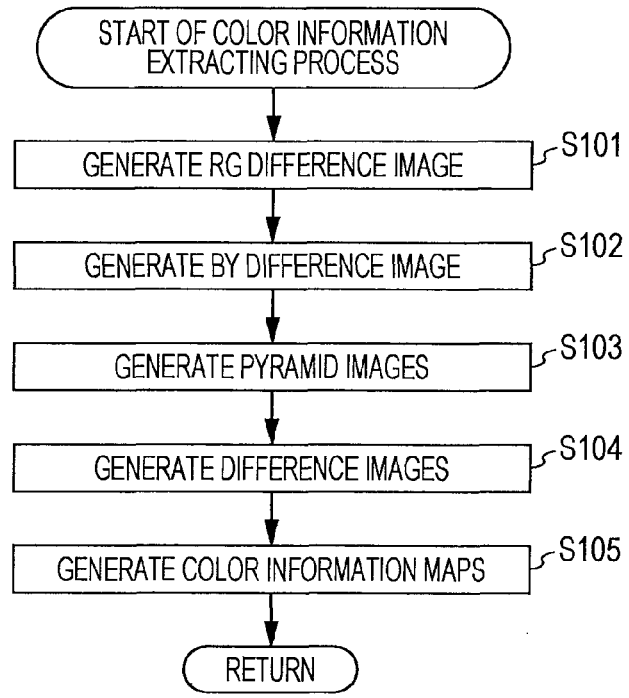
FIG. 11 is a flowchart describing a color information extracting process.

Next, with reference to the flowchart in FIG. 11, the color information extracting process corresponding to processing in step S42 of FIG. 9 will be described.

In step S101, the RG difference image generating unit 111 generates an RG difference image using the supplied input image, and supplies the RG difference image to the pyramid image generating unit 113.

In step S102, the BY difference image generating unit 112 generates a BY difference image using the supplied input image, and supplies the BY difference image to the pyramid image generating unit 114.

In step S103, the pyramid image generating unit 113 and the pyramid image generating unit 114 generate pyramid images using the RG difference image from the RG difference image generating unit 111 and the BY difference image from the BY difference image generating unit 112.

For example, the pyramid image generating unit 113 generates pyramid images in individual layers from level L1 to level L8 by generating a plurality of RG difference images with different resolutions, and supplies the pyramid images to the difference calculating unit 115. Similarly, the pyramid image generating unit 114 generates pyramid images in individual layers from level L1 to level L8 by generating a plurality of BY difference images with different resolutions, and supplies the pyramid images to the difference calculating unit 116.

In step S104, the difference calculating unit 115 and the difference calculating unit 116 generate difference images based on the pyramid images supplied from the pyramid image generating unit 113 and the pyramid image generating unit 114, normalize the difference images, and supply the normalized difference images to the color information map generating unit 117 and the color information map generating unit 118. In normalization of the difference images, for example, the pixel value of a pixel is caused to take a value between 0 and 255.

For example, the difference calculating unit 115 obtains the differences between, among the RG-difference pyramid images in the individual layers, pyramid images included in combinations of the individual layers of level L6 and level L3, level L7 and level L3, level L7 and level L4, level L8 and level L4, and level L8 and level L5. Accordingly, five RG-difference difference images in total are obtained.

Similarly, the difference calculating unit 116 obtains the differences between, among the BY-difference pyramid images in the individual layers, pyramid images included in combinations of the individual layers of level L6 and level L3, level L7 and level L3, level L7 and level L4, level L8 and level L4, and level L8 and level L5. Accordingly, five BY-difference difference images in total are obtained.

The process of generating these difference images is equivalent to applying a filtering process to an RG difference image or a BY difference image using a band-pass filter and extracting a certain frequency component from the RG difference image or the BY difference image. The pixel value of a pixel of a difference image obtained in this manner indicates the difference between specific color components of the pyramid images at individual levels, that is, the difference between a specific color component of a pixel of the input image and the average specific color component around that pixel.

In general, a region of an image that has a color that is striking compared with the surroundings, that is, a region where a difference from the surroundings with a specific color component is great, is a striking region that draws attention of a person who sees that image. Thus, that region is highly likely to be a region of a photographic subject. Therefore, it can be said that, in each difference image, a pixel with a greater pixel value indicates a region that is highly likely to be a region of a photographic subject.

In step S105, the color information map generating unit 117 and the color information map generating unit 118 generate color information maps using the difference images from the difference calculating unit 115 and the difference images from the difference calculating unit 116, and supply the color information maps to the map generating unit 56.

For example, the color information map generating unit 117 performs weighted addition of the RG-difference difference images supplied from the difference calculating unit 115 using difference weights Wa obtained in advance for the individual difference images, and obtains an RG-difference color information map.

Similarly, the color information map generating unit 118 performs weighted addition of the BY-difference difference images supplied from the difference calculating unit 116 using difference weights Wa obtained in advance, and obtains a BY-difference color information map. Note that, at the time of generation of a color information map, up-conversion of the difference images is performed so that the individual difference images will have the same size.

Figure 9:
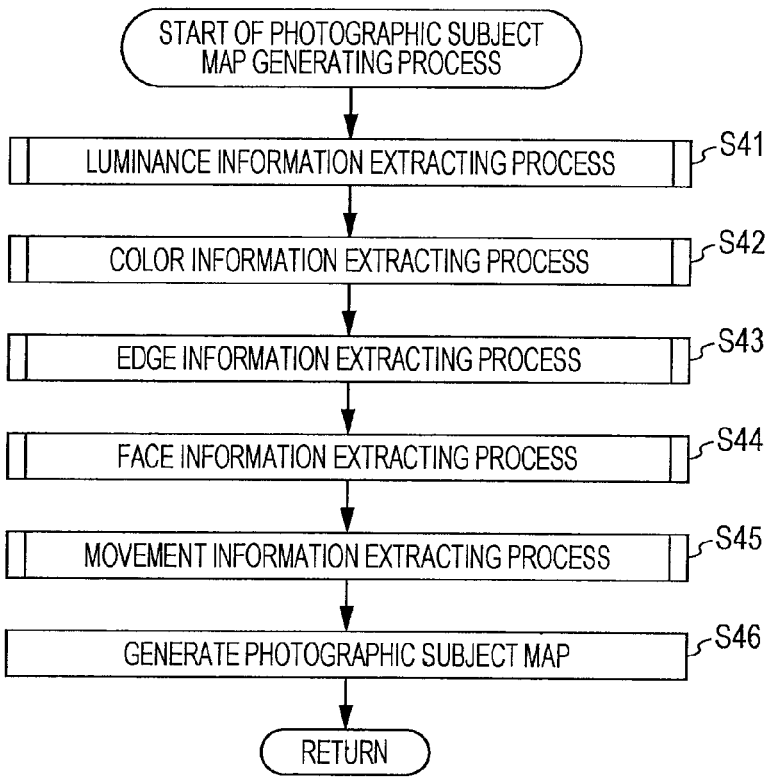
FIG. 9 is a flowchart describing a photographic subject map generating process.
Figure 10:
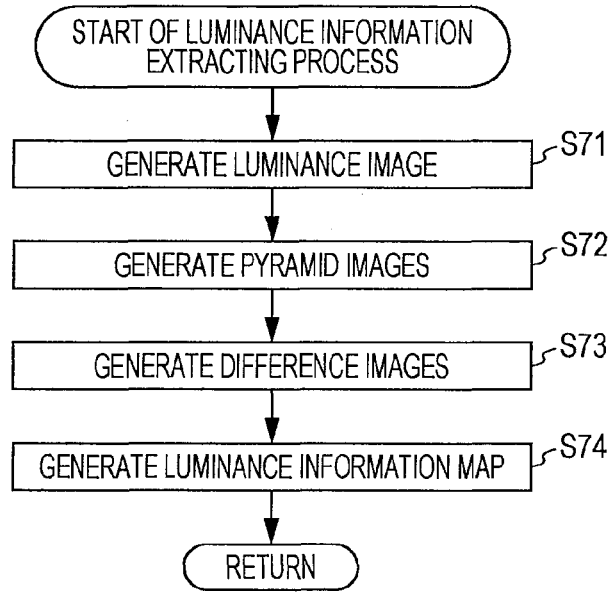
FIG. 10 is a flowchart describing a luminance information extracting process.

When the color information map generating unit 117 and the color information map generating unit 118 supply the RG-difference color information map and the BY-difference color information map obtained in this manner to the map generating unit 56, the color information extracting process ends, and the process proceeds to step S43 of FIG. 9.

In this manner, the color information extracting unit 52 obtains difference images of specific color components based on the input image, and generates color information maps based on those images. According to the color information maps obtained in this manner, in the input image, a region where a difference in a specific color component is great, that is, a region that is likely to draw attention of an observer who glances at the input image, can be easily detected.

Note that, it has been described that, at the color information extracting unit 52, the difference between an R (red) component and a green (G) component and the difference between a B (blue) component and a Y (yellow) component are extracted as color information extracted from the input image. However, for example, a chrominance component Cr and a chrominance component Cb may be extracted. Here, the chrominance component Cr is the difference between an R component and a luminance component, and the chrominance component Cb is the difference between a B component and a luminance component.

Figure 12:
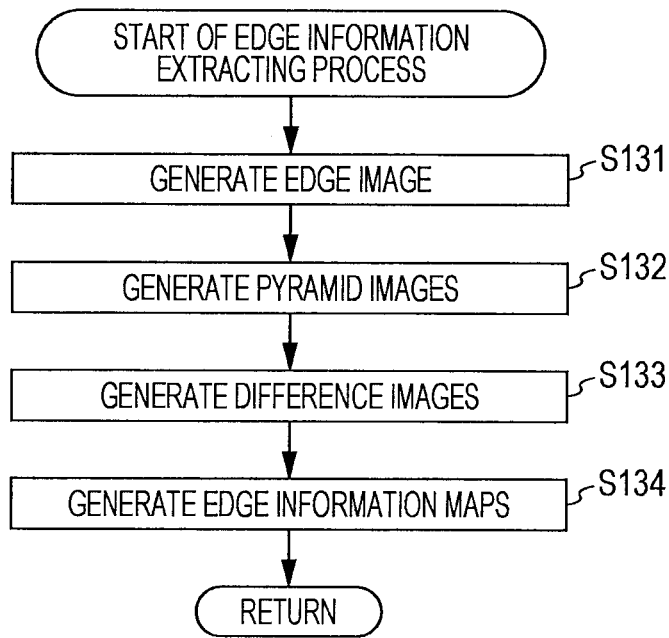
FIG. 12 is a flowchart describing an edge information extracting process.

FIG. 12 is a flowchart describing the edge information extracting process corresponding to processing in step S43 of FIG. 9. Hereinafter, the edge information extracting process will be described.

In step S131, the edge image generating unit 141 to the edge image generating unit 144 individually apply a filtering process using a Gabor filter to the supplied input image, and generate edge images in which, for example, edge intensities in orientations of 0 degrees, 45 degrees, 90 degrees, and 135 degrees serve as the pixel values of pixels. The edge image generating unit 141 to the edge image generating unit 144 supply the generated edge images to the pyramid image generating unit 145 to the pyramid image generating unit 148.

In step S132, the pyramid image generating unit 145 to the pyramid image generating unit 148 generate pyramid images using the edge images from the edge image generating unit 141 to the edge image generating unit 144, and supply the pyramid images to the difference calculating unit 149 to the difference calculating unit 152.

For example, the pyramid image generating unit 145 generates pyramid images in individual layers from level L1 to level L8 by generating a plurality of edge images in the 0-degree orientation with different resolutions, and supplies the pyramid images to the difference calculating unit 149. Similarly, the pyramid image generating unit 146 to the pyramid image generating unit 148 generate pyramid images in individual layers from level L1 to level L8, and supply the pyramid images to the difference calculating unit 150 to the difference calculating unit 152.

In step S133, the difference calculating unit 149 to the difference calculating unit 152 generate difference images using the pyramid images supplied from the pyramid image generating unit 145 to the pyramid image generating unit 148, normalize the difference images, and supply the normalized difference images to the edge information map generating unit 153 to the edge information map generating unit 156. In normalization of the difference images, for example, the pixel value of a pixel is caused to take a value between 0 and 255.

For example, the difference calculating unit 149 obtains the differences between, among the 0-degree orientation edge pyramid images in the individual layers, which are supplied from the pyramid image generating unit 145, pyramid images included in combinations of the individual layers of level L6 and level L3, level L7 and level L3, level L7 and level L4, level L8 and level L4, and level L8 and level L5. Accordingly, five edge difference images in total are obtained.

Similarly, the difference calculating unit 150 to the difference calculating unit 152 obtain the differences between, among the pyramid images in the individual layers, pyramid images included in combinations of the individual layers of level L6 and level L3, level L7 and level L3, level L7 and level L4, level L8 and level L4, and level L8 and level L5. Accordingly, five edge difference images in total are obtained for the edge in each orientation.

The process of generating these difference images is equivalent to applying a filtering process to an edge image using a band-pass filter and extracting a certain frequency component from the edge image. The pixel value of a pixel of a difference image obtained in this manner indicates the difference between edge intensities of the pyramid images at individual levels, that is, the difference between the edge intensity at a certain position of the input image and the average edge intensity around that position.

In general, a region of an image where the edge intensity is great compared with the surroundings is a striking region that draws attention of a person who sees that image. Thus, that region is highly likely to be a region of a photographic subject. Therefore, it can be said that, in each difference image, a pixel with a greater pixel value indicates a region that is highly likely to be a region of a photographic subject.

In step S134, the edge information map generating unit 153 to the edge information map generating unit 156 generate edge information maps in the respective orientations using the difference images from the difference calculating unit 149 to the difference calculating unit 152, and supply the edge information maps to the map generating unit 56.

For example, the edge information map generating unit 153 performs weighted addition of the difference images supplied from the difference calculating unit 149 using difference weights Wa obtained in advance, and obtains an edge information map in the 0-degree orientation.

Similarly, the edge information map generating unit 154 to the edge information map generating unit 156 perform weighted addition of the difference images supplied from the difference calculating unit 150 to the difference calculating unit 152 using difference weights Wa, and obtain edge information maps in respective orientations of 45 degrees, 90 degrees, and 135 degrees. Note that, at the time of generation of an edge information map, up-conversion of the difference images is performed so that the individual difference images will have the same size.

When the edge information map generating unit 153 to the edge information map generating unit 156 supply the four edge information maps in total in the respective orientations obtained in this manner to the map generating unit 56, the edge information extracting process ends, and the process proceeds to step S44 of FIG. 9.

In this manner, the edge information extracting unit 53 obtains edge difference images in specific orientations based on the input image, and generates edge information maps based on those difference images. According to the edge information maps in the individual orientations obtained in this manner, in the input image, a region where the edge intensity in a specific orientation is great compared with the surroundings, that is, a region that is likely to draw attention of an observer who glances at the input image, can be easily detected.

Note that, it has been described that, in the edge information extracting process, a Gabor filter is used to extract edge. However, an edge extraction filter such as a Sobel filter or a Roberts filter may be used.

Figure 13:
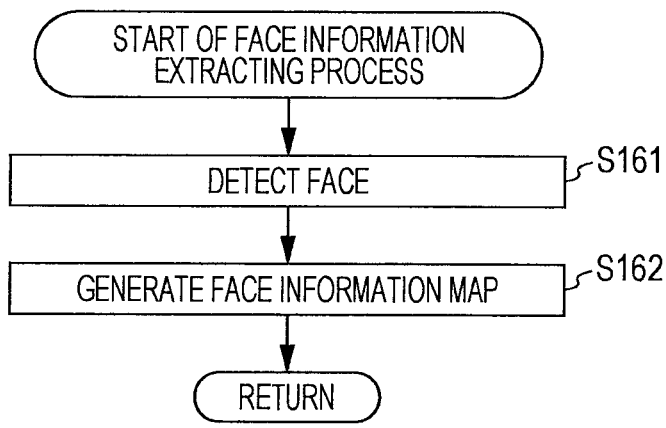
FIG. 13 is a flowchart describing a face information extracting process.

Next, with reference to the flowchart in FIG. 13, the face information extracting process corresponding to processing in step S44 of FIG. 9 will be described.

In step S161, the face detecting unit 181 detects, in the supplied input image, a region of the face of a person, and supplies the detection result to the face information map generating unit 182. For example, the face detecting unit 181 applies a filtering process using a Gabor filter to the input image, and extracts characteristic regions such as the eyes, the mouth, and the nose of a person from the input image, thereby detecting a region of the face in the input image.

In step S162, the face information map generating unit 182 generates a face information map using the detection result from the face detecting unit 181, and supplies the face information map to the map generating unit 56.

For example, it is assumed that a plurality of rectangular regions (hereinafter called candidate regions) in the input image that are estimated to include a face have been detected as detection results of a face in the input image. Here, it is assumed that a plurality of candidate regions may be detected near a certain position in the input image, and portions of these candidate regions may overlap. That is, for example, in the case where, for a single region of a face in the input image, a plurality of candidate regions including that face are obtained, portions of these candidate regions overlap.

The face information map generating unit 182 generates, for each of the candidate regions obtained as a result of face detection, a detection image with the same size as the input image. This detection image is such that the pixel value of a pixel of the detection image in the same region as a candidate region being processed takes a greater value than the pixel value of a pixel in a region different from the candidate region.

Also, the pixel value of a pixel of a detection image becomes greater as the pixel is at the same position as a pixel in a candidate region estimated to be highly likely to include the face of a person. The face information map generating unit 182 adds detection images obtained in this manner to generate a single image, normalizes the single image, and obtains a face information map. Therefore, in the face information map, the pixel value of a pixel in the same region as a region where portions of a plurality of candidate regions overlap in the input image becomes greater, and it means that that pixel is more likely to include a face. Note that normalization is performed so that the pixel value of a pixel of the face information map takes a value between, for example, 0 and 255.

When the face information map is generated, the face information extracting process ends, and the process proceeds to step S45 of FIG. 9.

In this manner, the face information extracting unit 54 detects a face in the input image, and generates a face information map based on the detection result. According to the face information map obtained in this manner, a region of the face of a person serving as a photographic subject in the input image can be easily detected.

Figure 14:
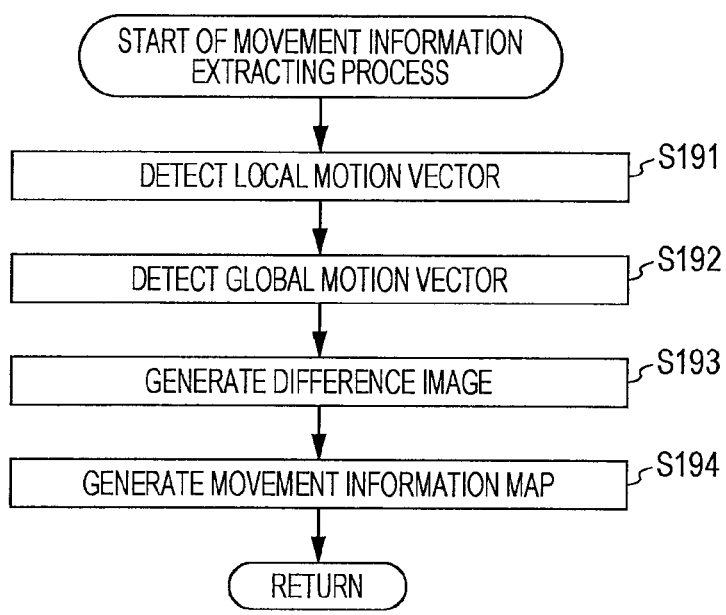
FIG. 14 is a flowchart describing a movement information extracting process.

Further, with reference to the flowchart in FIG. 14, the movement information extracting process corresponding to processing in step S45 of FIG. 9 will be described.

In step S191, the local motion vector extracting unit 211 detects, using the supplied input image, a local motion vector of each pixel of the input image by using a gradient method or the like, and supplies the local motion vector to the difference calculating unit 213.

In step S192, the global motion vector extracting unit 212 detects a global motion vector using the supplied input image, and supplies the global motion vector to the difference calculating unit 213.

In step S193, the difference calculating unit 213 obtains the absolute value of the difference between the local motion vector from the local motion vector extracting unit 211 and the global motion vector from the global motion vector extracting unit 212, and generates a movement difference image. The difference calculating unit 213 supplies the generated movement difference image to the movement information map generating unit 214.

In step S194, the movement information map generating unit 214 normalizes the difference image supplied from the difference calculating unit 213 to obtain a movement information map, and supplies the movement information map to the map generating unit 56. Here, normalization of the difference image is performed so that the pixel value of each pixel takes a value between, for example, 0 and 255. When the movement information map is generated, the movement information extracting process ends, and the process proceeds to step S46 of FIG. 9.

In this manner, the movement information extracting unit 55 detects movement based on the input image, and generates a movement information map based on the detection result. According to the movement information map obtained in this manner, a region of a moving object in the input image can be easily detected. In the input image, a region of a moving object is a region that is likely to draw attention of an observer who glances at the input image, which is highly likely to be a photographic subject.

According to the luminance information extracting process to the movement information extracting process described above, the respective information maps are obtained, and a photographic subject map is generated from these information maps.

Next, with reference to the flowchart in FIG. 15, the photographic subject region extracting process corresponding to processing in step S12 of FIG. 8 will be described.

In step S221, the gradient map generating unit 22 generates a gradient map using the photographic subject map supplied from the map generating unit 56 in the photographic subject map generating unit 21, and supplies the gradient map to the threshold processing unit 23, the threshold processing unit 24, and the binarized map generating unit 26.

For example, when two directions orthogonal to each other on the photographic subject map serve as the x-direction and the y-direction, the gradient map generating unit 22 generates an x-direction gradient map indicating a change in the pixel value in the x-direction of the photographic subject map and a y-direction gradient map indicating a change in the pixel value in the y-direction of the photographic subject map. The gradient map generating unit 22 regards the sum of the generated x-direction gradient map and y-direction gradient map as a gradient map.

Figure 16:
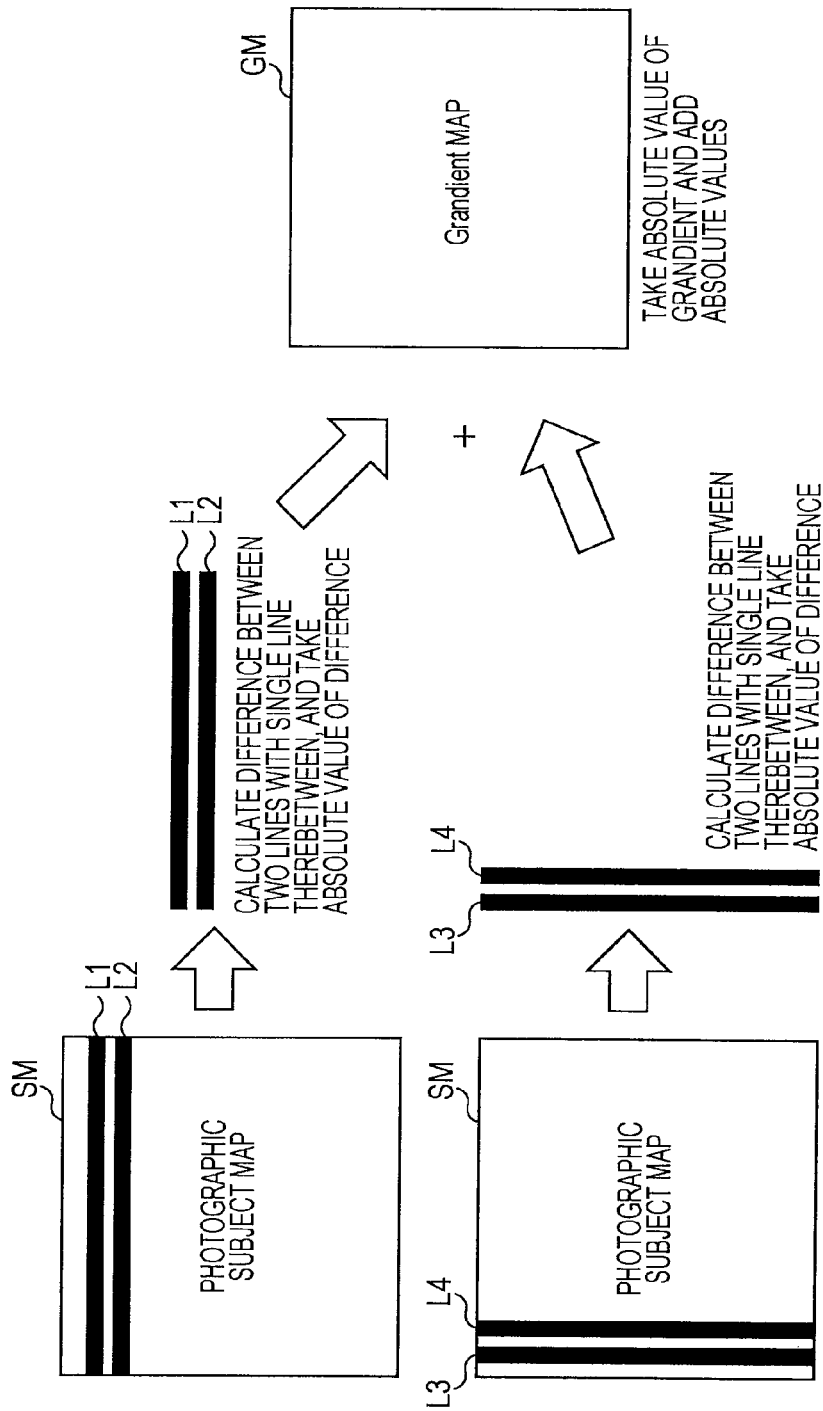
FIG. 16 is a diagram describing generation of a gradient map.

Specifically, as illustrated in the upper left portion of FIG. 16, attention is paid to a line L1 and a line L2 that are vertically arranged in a diagram of a photographic subject map SM. The absolute value of the difference between the pixel value of a pixel on the line L1 and the pixel value of a pixel on the line L2 serves as the pixel value of a pixel of the y-direction gradient map that is at the same position as the pixel on the line L1.

Note that, in FIG. 16, it is assumed that the vertical direction in the diagram serves as the y-direction, and the horizontal direction in the diagram serves as the x-direction. Also, the line L1 and the line L2 are lines of pixels of the photographic subject map SM arranged in the x-direction. Also, in FIG. 16, a line of pixels that are only two pixels below the line L1 in the diagram serves as the line L2.

For example, the absolute value of the difference between the pixel value of the pixel at the left end of the line L1 of the photographic subject map SM and the pixel value of the pixel at the left end of the line L2 serves as the pixel value of a pixel of the y-direction gradient map that is at the same position as the pixel at the left end of the line L1. The y-direction gradient map obtained in this manner indicates the degree of change in the pixel value of a pixel in the y-direction of the photographic subject map SM, that is, the intensity of edge of the likeliness of being a photographic subject.

Here, the line L1 and the line L2 are not two adjacent lines in order to prevent positional displacement from occurring between each position of the input image and the degree of change of the likeliness of being a photographic subject at that position, that is, the absolute value of the obtained difference. Note that the line L2 is not restricted to a line that is only two pixels below the line L1 in the diagram, and the line L2 may be any line as long as the line L2 is a line that is two or more pixels below the line L1.

Similarly, as illustrated in the lower left portion of FIG. 16, attention is paid to a line L3 and a line L4 that are horizontally arranged in a diagram of the photographic subject map SM. The absolute value of the difference between the pixel value of a pixel on the line L3 and the pixel value of a pixel on the line L4 serves as the pixel value of a pixel of the x-direction gradient map that is at the same position as the pixel on the line L3.

Note that the line L3 and the line L4 are lines of pixels of the photographic subject map SM arranged in the y-direction. Also, in FIG. 16, a line of pixels that are only two pixels on the right of the line L3 in the diagram serves as the line L4.

For example, the absolute value of the difference between the pixel value of the pixel at the top end of the line L3 of the photographic subject map SM and the pixel value of the pixel at the top end of the line L4 serves as the pixel value of a pixel of the x-direction gradient map that is at the same position as the pixel at the top end of the line L3. The x-direction gradient map obtained in this manner indicates the degree of change in the pixel value of a pixel in the x-direction of the photographic subject map SM, that is, the intensity of edge of the likeliness of being a photographic subject.

Note that the line L4 is not restricted to a line that is only two pixels on the right of the line L3 in the diagram, and the line L4 may be any line as long as the line L4 is a line that is two or more pixels on the right of the line L3.

The gradient map generating unit 22 adds the x-direction gradient map and the y-direction gradient map obtained in this manner to generate a gradient map GM. That is, when it is assumed that a pixel to which attention is paid on the gradient map GM serves as an attended pixel, the sum of the pixel value of a pixel of the x-direction gradient map that is at the same position as the attended pixel and the pixel value of a pixel of the y-direction gradient map that is at the same position as the attended pixel serves as the pixel value of the attended pixel. Note that the greater the pixel value of a pixel of the gradient map, the more likely a pixel of the input image that is at the same position as that pixel to be a pixel included in a photographic subject region.

When the gradient map obtained in this manner is used, compared with the photographic subject map, the position of a photographic subject in an image can be more certainly specified.

For example, the pixel value of a pixel in a region of a photographic subject in the photographic subject map becomes greater as the pixel becomes closer to a central region of that photographic subject, and becomes smaller as the pixel becomes farther from the center of the photographic subject. Now, it is assumed that the pixel value in a region of a photographic subject in the photographic subject map changes along the same gradient from a contour portion to a central portion of the photographic subject.

In this case, in the photographic subject map, when a region including pixels whose pixel values are greater than or equal to a predetermined threshold is regarded as a region of a photographic subject, the size of a region regarded as a photographic subject changes in accordance with the value of the threshold. Thus, it becomes difficult to accurately extract a region of a photographic subject from the input image. Specifically, the greater the threshold, the smaller the region regarded as a photographic subject. Also, when the threshold is too small, owing to the effects of noise, a region that is not a photographic subject is also regarded as a region of a photographic subject.

In contrast, the pixel value of a pixel of the gradient map indicates the degree of change of the likeliness of being a photographic subject, that is, the gradient of the pixel value of the photographic subject. Therefore, in the case where the pixel value in a region of a photographic subject on the photographic subject map changes along the same gradient from a contour portion to a central portion of the photographic subject, the pixel values of all pixels within the region of the photographic subject take substantially the same value on the gradient map. Therefore, the size of a region of a photographic subject extracted from the input image using the gradient map does not change much in accordance with the threshold, and a region of a photographic subject can be more accurately extracted.

Figure 15:
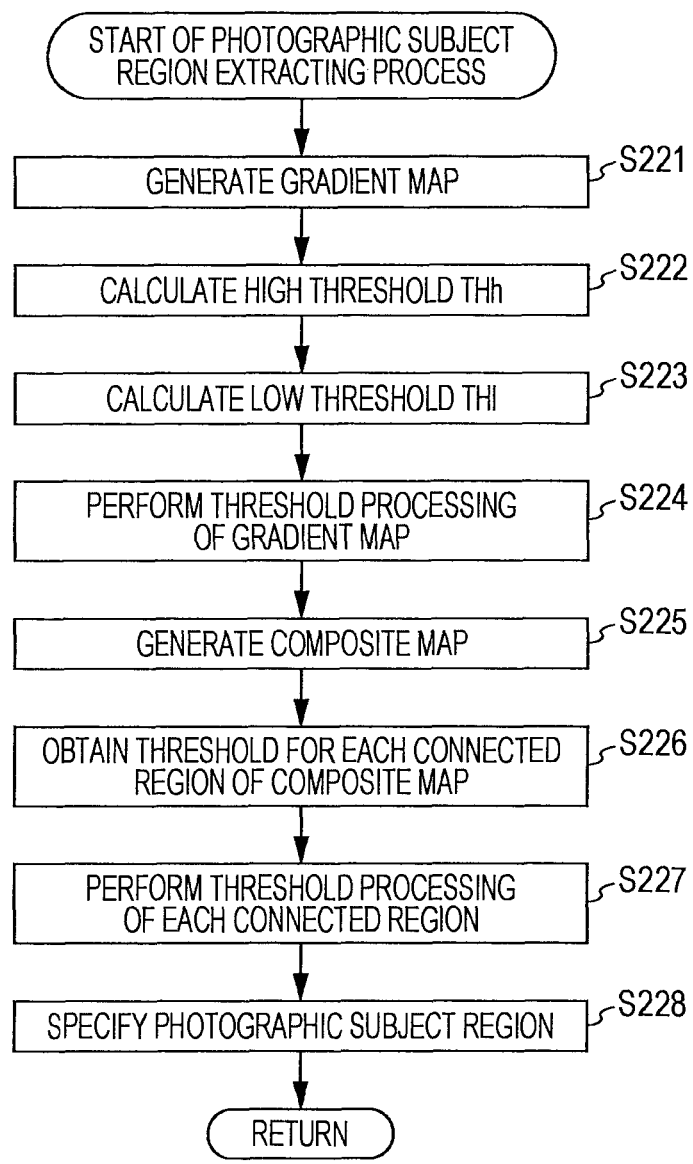
FIG. 15 is a flowchart describing a photographic subject region extracting process.

Referring back to the description of the flowchart in FIG. 15, in step S222, the threshold processing unit 23 calculates, using the gradient map supplied from the gradient map generating unit 22, a high threshold THh for extracting a photographic subject.

Figure 17:
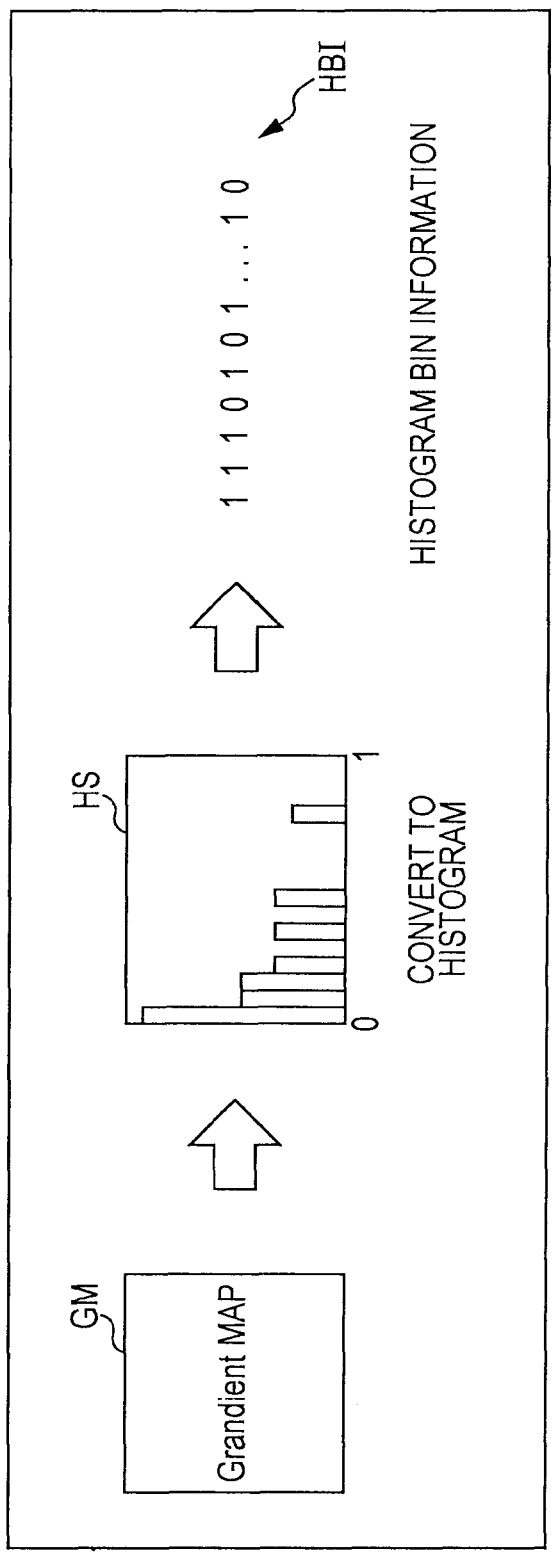
FIG. 17 is a diagram describing calculation of a threshold.

For example, as illustrated in FIG. 17, the threshold processing unit 23 generates, based on the gradient map GM, a histogram HS with the range of pixel values of the gradient map as a bin.

Specifically, in the case where the range in which the value that the pixel value of a pixel of the gradient map GM may take ranges from 0 to 1, the histogram with 100 bins is generated in which the horizontal axis is the value of a bin, and the vertical axis is the number of pixels of the gradient map GM belonging to each bin, that is, the frequency value of pixels. For example, pixels of the gradient map GM whose pixel values range from 0 to 0.01 belong to one bin, and the median of the bin is 0.005.

Next, the threshold processing unit 23 binarizes the frequency value of each bin of the generated histogram HS, and generates, as histogram bin information HBI, information obtained by arranging the binarized values of the bins in the ascending order of the medians of the bins. Here, binarization of the frequency value of a bin is performed by regarding the binarized value as 0 in the case where the frequency value is 0, and regarding the binarized value as 1 in the case where the frequency value is a positive value different from 0. Therefore, for example, in the case where the frequency value of a bin with the smallest median is 5, the value of the head of the histogram bin information HBI is 1.

Further, the threshold processing unit 23 regards the median of a predetermined a-th (e.g., 18-th) bin, whose binarized value is 1, from the tail of the histogram bin information HBI as the high threshold THh. For example, it is assumed that the values of the histogram bin information HBI are "1", "0", "1", and "1" in this order from the tail, and the value of the above-described a is "3". In this case, since the third bin from the tail whose binarized value is 1 is the bin corresponding to the fourth value from the tail of the histogram bin information HBI, the median of that bin is regarded as the high threshold THh.

Referring back to the flowchart in FIG. 15, in step S223, the threshold processing unit 24 calculates, using the gradient map supplied from the gradient map generating unit 22, a low threshold THl for extracting a photographic subject.

For example, the threshold processing unit 24 generates the same histogram as the histogram generated by the threshold processing unit 23, and obtains the number of pixels B corresponding to predetermined b percent (e.g., 12 percent) of the number of pixels of the entire gradient map. The threshold processing unit 24 regards, among the pixels of the gradient map, the median of a bin of the histogram to which a pixel with a B-th greatest pixel value belongs as the low threshold THl.

That is, in the entire gradient map, among top b percent pixels with greater pixel values, a pixel with the smallest pixel value is selected, and the median of a bin to which that pixel belongs is regarded as the low threshold THl.

The low threshold THl and high threshold THh obtained as above are used for extracting a photographic subject region from the input image by using the gradient map.

The low threshold THl is a threshold for extracting a region regarded as likely to include a photographic subject from the input image. That is, in the gradient map, in a region of the input image that is at the same position as a region including pixels whose pixel values are greater than or equal to the low threshold THl, there is a region that certainly includes a photographic subject, but there is also a region that includes no photographic subject but includes noise.

Also, the high threshold THh is a threshold for extracting a region regarded as highly likely to certainly include a photographic subject, that is, a region that is likely to be a photographic subject. That is, in the gradient map, a region of the input image that is at the same position as a region including pixels whose pixel values are greater than or equal to the high threshold THh is highly likely to certainly include a photographic subject, but that region may be narrower than a region of the actual photographic subject. Therefore, the input image may include, besides a region regarded as a photographic subject region, a region that actually includes a photographic subject.

Here, regarding the high threshold THh and the low threshold THl, constants a and b for obtaining these thresholds are statistically obtained in advance so that the high threshold THh becomes a greater value than the low threshold THl.

Therefore, a region of the input image specified as a region of a photographic subject based on the low threshold THl always includes a region of the input image specified as a region of a photographic subject based on the high threshold THh. That is, it can be said that the high threshold THh is a threshold for more certainly detecting a region that is likely to be a photographic subject than a region that is likely to be a photographic subject that is detected using the low threshold THl.

Note that, in the case where the low threshold THl becomes greater than the high threshold THh, the obtained low threshold THl may be used as the high threshold THh, and the obtained high threshold THh may be used as the low threshold THl. Also, the constants a and b may be changed to other values obtained in advance, and the high threshold THh and the low threshold THl may be obtained again.

Further, although it has been described that the high threshold THh and the low threshold THl are obtained based on the gradient map, the high threshold THh and the low threshold THl may be determined in advance.

In step S224, the threshold processing unit 23 and the threshold processing unit 24 perform threshold processing of the gradient map using the obtained high threshold THh and low threshold THl, and generate threshold maps.

That is, the threshold processing unit 23 regards a pixel to which attention is paid on a threshold map to be generated as an attended pixel. In the case where the pixel value of a pixel of the gradient map that is at the same position as the attended pixel is greater than or equal to the high threshold THh, the threshold processing unit 23 regards the pixel value of the attended pixel as 1. Also, in the case where the pixel value of a pixel of the gradient map that is at the same position as the attended pixel is less than the high threshold THh, the threshold processing unit 23 regards the pixel value of the attended pixel as 0. The threshold processing unit 23 supplies a threshold map obtained in this manner to the composite map generating unit 25.

Similarly, the threshold processing unit 24 regards a pixel to which attention is paid on a threshold map to be generated as an attended pixel. In the case where the pixel value of a pixel of the gradient map that is at the same position as the attended pixel is greater than or equal to the low threshold THl, the threshold processing unit 24 regards the pixel value of the attended pixel as 1. Also, in the case where the pixel value of a pixel of the gradient map that is at the same position as the attended pixel is less than the low threshold THl, the threshold processing unit 24 regards the pixel value of the attended pixel as 0. The threshold processing unit 24 supplies a threshold map obtained in this manner to the composite map generating unit 25.

In step S225, the composite map generating unit 25 generates a composite map based on the threshold maps supplied from the threshold processing unit 23 and the threshold processing unit 24.

Specifically, the composite map generating unit 25 adds the threshold map supplied from the threshold processing unit 23 and the threshold map supplied from the threshold processing unit 24 to generate a single new map. That is, when it is assumed that a pixel to which attention is paid on a map to be newly generated serves as an attended pixel, the sum of the pixel values of pixels of the two threshold maps that are at the same position as the attended pixel serves as the attended pixel. Therefore, the pixel value of a pixel of a map to be newly generated takes any of the values 0, 1, and 2.

Figure 18:
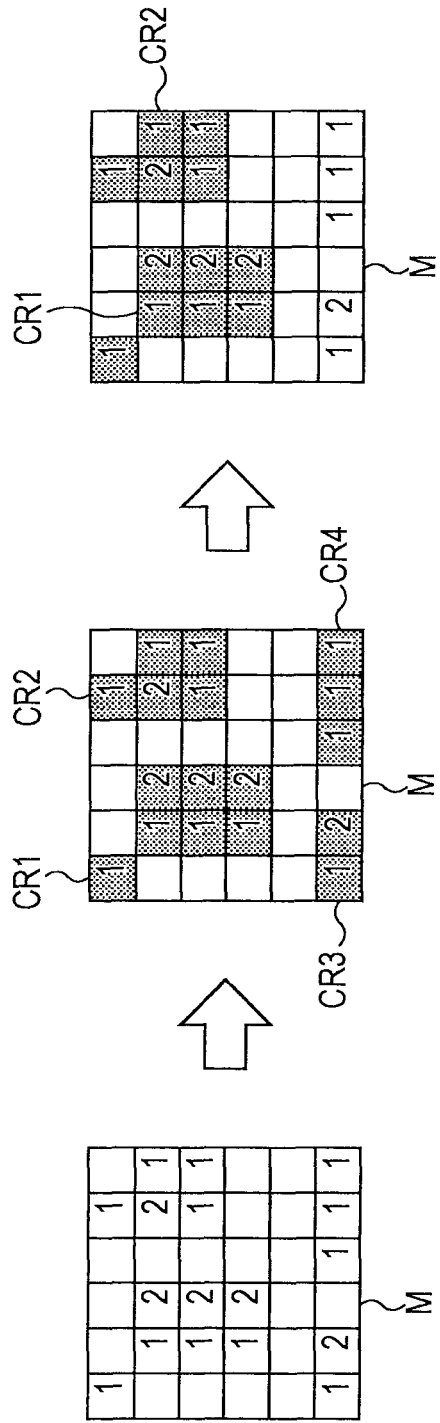
FIG. 18 is a diagram describing generation of a composite map.

Accordingly, for example, a map M illustrated on the left side of the diagram of FIG. 18 is obtained. Note that, in FIG. 18, one rectangle indicates one pixel on the map, and the numeral within a rectangle indicates the pixel value of a pixel represented by that rectangle. Also, a rectangle without a numeral represents a pixel whose pixel value is 0.

On the map M on the left side of the diagram, there is a plurality of regions where pixels whose pixel values are 1 or 2 are adjacent to each other, and these regions are regarded as regions that are likely to include a photographic subject.

Next, the composite map generating unit 25 regards, as illustrated at the center of the diagram, a region that includes pixels whose pixel values are 1 or 2 and that includes adjacent pixels as a connected region. For example, in the example of the center of the diagram, four regions CR1 to CR4 are regarded as connected regions.

Further, the composite map generating unit 25 selects, from among the connected regions on the map M, a connected region that includes a pixel whose pixel value is 2 and that has an area of three or more pixels. The composite map generating unit 25 regards the pixel values of pixels within the selected connected region as 1, regards the pixel values of the other pixels as 0, and regards a map obtained as a result thereof as a composite map.

For example, in the example of FIG. 18, among the region CR1 to the region CR4, the connected region CR3 whose area is less than three pixels and the connected region CR4 which does not include a pixel whose pixel value is 2 are excluded, and, as illustrated on the right side of the diagram, the region CR1 and the region CR2 are selected. These region CR1 and region CR2 are regions that include a pixel whose pixel value is 2 and that has an area of three or more pixels.

The pixel values of pixels within the selected region CR1 and region CR2 are regarded as 1, and the pixel values of the other pixels are regarded as 0, thereby generating a composite map. In the composite map, a pixel whose pixel value is 1 is a pixel regarded as being included in a photographic subject region, and a pixel whose pixel value is 0 is a pixel regarded as not being included in a photographic subject region.

Here, in the map M before a composite map is generated, a region regarded as a connected region is a region that includes, in the gradient map, pixels with pixel values that are greater than or equal to at least one threshold of the high threshold THh and the low threshold THl. Therefore, it can be said that a connected region of the map M indicates a candidate for a photographic subject region.

At generation of a composite map, a connected region that does not include a pixel whose pixel value is 2 and that has an area less than three pixels is excluded from a connected region(s) of the map M because of the following reasons.

That is, a pixel of the map M whose pixel value is 2 indicates that the pixel value of a pixel of the gradient map that is at the same position as that pixel is greater than both the high threshold THh and the low threshold THl. That is, it is indicated that a region of the input image that is at the same position as that pixel is highly likely to be a photographic subject region.

In contrast, a pixel of the map M whose pixel value is 1 indicates that the pixel value of a pixel of the gradient map that is at the same position as that pixel is greater than the low threshold THl but is less than the high threshold THh. That is, it is indicated that a region of the input image that is at the same position as that pixel may be a photographic subject region, though not for sure.

Therefore, in the map M, a connected region that includes more pixels whose pixel values are 2 is more likely to be a photographic subject region, and a connected region that includes only pixels whose pixel values are 1 may be a photographic subject region, but the probability is not so high. Thus, excluding a connected region that includes only pixels whose pixel values are 1 from a candidate(s) for a photographic subject region allows more accurate extraction of a photographic subject region from the input image.

Also, in general, a region with a small area is very likely to be a noise region, instead of a photographic subject region. Thus, a connected region whose area is less than a predetermined certain area, such as a connected region whose area is less than three pixels, is excluded from a candidate(s) for a photographic subject region. Accordingly, a photographic subject region can be more accurately extracted from the input image.

When the composite map generating unit 25 generates a composite map as above, the composite map generating unit 25 supplies the generated composite map to the binarized map generating unit 26.

Referring back to the description of the flowchart in FIG. 15, in step S226, the binarized map generating unit 26 obtains, using the gradient map from the gradient map generating unit 22, a threshold for each connected region of the composite map from the composite map generating unit 25.

In step S227, the binarized map generating unit 26 performs threshold processing of each connected region using the obtained threshold, and generates a binarized map.

Figure 19:
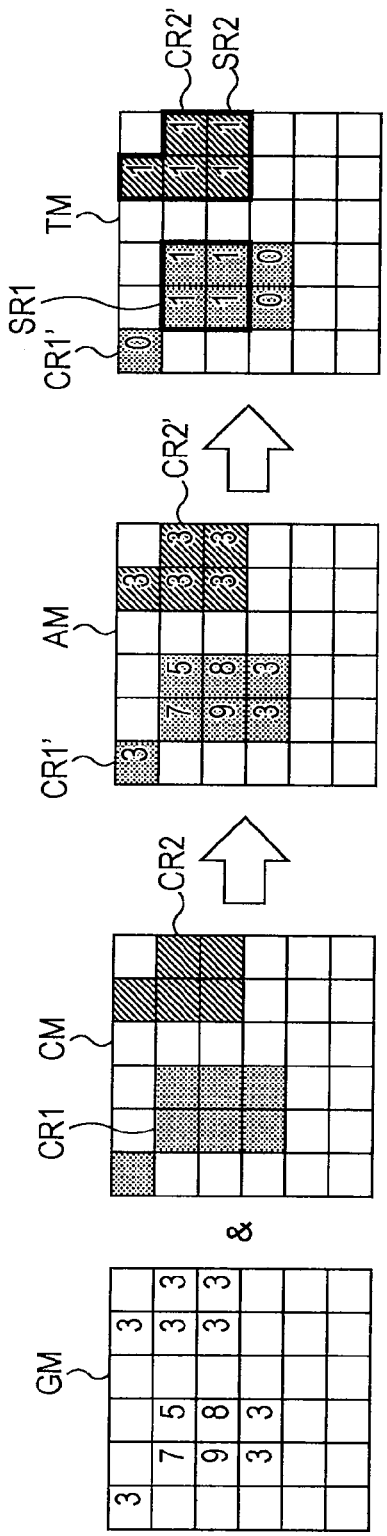
FIG. 19 is a diagram describing generation of a binarized map.

For example, as illustrated in FIG. 19, the binarized map generating unit 26 obtains the AND of the gradient map GM and the composite map CM. Note that, in FIG. 19, one rectangle indicates one pixel on the map, and the numeral within a rectangle indicates the pixel value of a pixel represented by that rectangle.

It is assumed that a map obtained based on the AND serves as a map AM, and a pixel to which attention is paid on the map AM serves as an attended pixel. In this case, the binarized map generating unit 26 obtains the product of the pixel value of a pixel of the gradient map GM that is at the same position as the attended pixel and the pixel value of a pixel of the composite map CM that is at the same position as the attended pixel, and regards the value obtained as a result thereof as the pixel value of the attended pixel.

Since only the pixel values of pixels of the region CR1 and the region CR2 regarded as the connected regions are 1 in the composite map CM, the pixel values of pixels in a region CR1' and a region CR2' of the map AM are the pixel values of pixels of the gradient map GM that are at the same positions as those pixels. Also, the pixel values of pixels of the map AM that are not included in the region CR1' and the region CR2''' are all 0.

Note that the region CR1' and the region CR2' of the map AM are regions that are at the same positions as the region CR1 and the region CR2 of the composite map CM. Hereinafter, these region CR1' and region CR2' will also be referred to as connected regions.

Next, the binarized map generating unit 26 obtains a threshold for each connected region of the obtained map AM. For example, the binarized map generating unit 26 obtains the maximum value among the pixel values of pixels within a connected region of the map AM, and regards a value obtained in advance for that value as a threshold of that connected region.

For example, it is assumed that, in the case where the maximum value of the pixel values within a connected region is 4 or greater, a threshold of that connected region is 4. In the case where the maximum value of the pixel values within a connected region is less than 4, a threshold of that connected region is 1.

In this case, since the maxim value of the pixel values of pixels within the region CR1' of the map AM is 9, the binarized map generating unit 26 regards a threshold of the region CR1' as 4. Similarly, since the maximum value of the pixel values of pixels within the region CR2' of the map AM is 3, the binarized map generating unit 26 regards a threshold of the region CR2' as 1.

Note that a threshold for a connected region is statistically obtained in advance. Also, more specifically, since the pixel values of pixels of a gradient map take values between 0 and 1, for example, if the maximum value of the pixel values within a connected region is 0.4 or greater, a threshold is 0.33, and, if the maximum value of the pixel values within a connected region is less than 0.4, a threshold is 0.08.

Further, a threshold for a connected region is set such that, for example, the threshold becomes greater as the maximum value of the pixel values within a connected region becomes greater. This is because, when pixels with greater pixel values are included in a connected region, it can be estimated that the pixel value of a pixel included in a certain portion that is truly a photographic subject region, that is, the pixel value of the gradient map GM that is at the same position as that pixel, becomes greater.

Therefore, extracting, from a connected region serving as a candidate for a photographic subject region, a region only including pixels with pixel values that are greater than or equal to a threshold determined for that connected region should allow extraction of a region estimated truly as a photographic subject region.

To this end, the binarized map generating unit 26 binarizes the map AM based on thresholds respectively obtained for the region CR1' and the region CR2' and obtains a binarized map TM.

Specifically, the binarized map generating unit 26 regards, among pixels within the region CR1' of the map AM, the pixel values of pixels whose pixel values are greater than or equal to the threshold 4 of the region CR1' as 1, and regards the pixel values of pixels whose pixel values are less than the threshold 4 of the region CR1' as 0. Further, the binarized map generating unit 26 regards, among pixels within the region CR2' of the map AM, the pixel values of pixels whose pixel values are greater than or equal to the threshold 1 of the region CR2' as 1, and regards the pixel values of pixels whose pixel values are less than the threshold 1 of the region CR2' as 0.

For example, in the example on the right side of the diagram of FIG. 19, it is assumed that the pixel values of pixels within two region SR1 and region SR2 of the obtained binarized map TM are 1, and the pixel values of the other pixels are 0.

That is, it is assumed that, in the region CR1' regarded as a connected region, only the pixel values of pixels within the region SR1 are 1, and the pixel values of pixels within the other region of CR1' are 0. Also, it is assumed that, in the region CR2' regarded as a connected region, the pixel values of pixels within the region CR2' are all 1.

In the binarized map TM obtained in this manner, a region including pixels whose pixel values are 1 is a region estimated truly as a photographic subject region. Therefore, for example, in the input image, regions that are at the same positions as the region SR1 and the region SR2 of the binarized map TM are regarded as photographic subject regions.

When the binarized map generating unit 26 generates the binarized map, the binarized map generating unit 26 supplies the generated binarized map to the rectangle shaping unit 27.

Referring back to the description of the flowchart in FIG. 15, in step S228, the rectangle shaping unit 27 specifies a photographic subject region based on the binarized map supplied from the binarized map generating unit 26, and supplies photographic subject region information indicating the photographic subject region to the display control unit 28.

Figure 20:
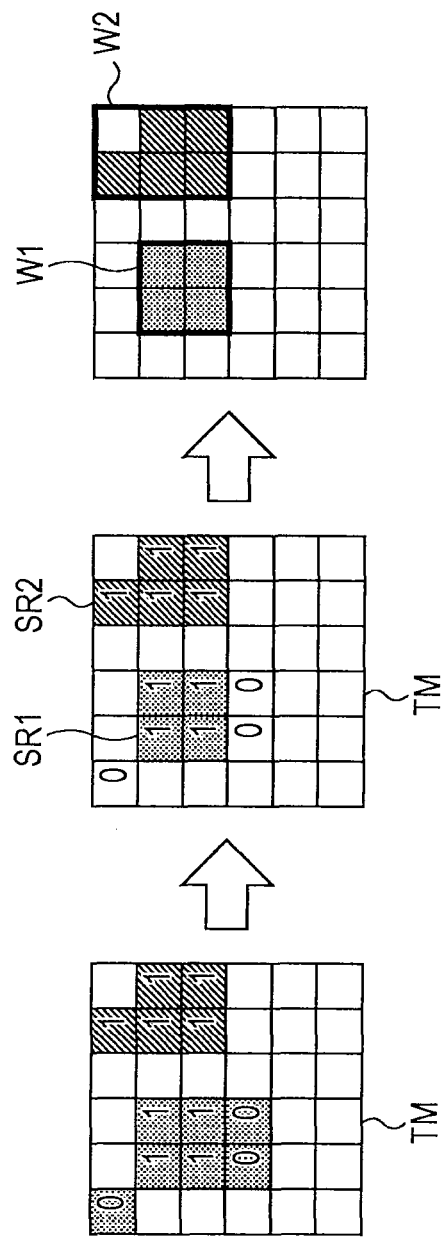
FIG. 20 is a diagram describing generation of photographic subject region information.

For example, in the case where the binarized map TM illustrated on the left side of FIG. 20 is supplied to the rectangle shaping unit 27, the rectangle shaping unit 27 regards, in the binarized map TM, a region that includes pixels whose pixel values are 1 and that includes adjacent pixels as a connected region. For example, in the example at the center of the drawing, two region SR1 and region SR2 are regarded as connected regions.

As illustrated on the right side of the drawing, the rectangle shaping unit 27 regards a rectangular frame W1 and a rectangular frame W2 surrounding the region SR1 and the region SR2 regarded as connected regions as the positions of photographic subject frames surrounding photographic subject regions, and generates information indicating the positions of the frame W1 and the frame W2 as photographic subject region information. The rectangle shaping unit 27 supplies the generated photographic subject region information to the display control unit 28.

As in the example of FIG. 20, making regions indicating photographic subject regions rectangles, regarding these rectangles as a frame W1 and a frame W2, and generating photographic subject region information indicating these frame regions allows easy displaying of photographic subject frames using an application program at a subsequent stage. That is, a process of determining frames surrounding photographic subjects based on the specified regions of photographic subjects becomes unnecessary.

When the photographic subject region information is supplied in this manner from the rectangle shaping unit 27 to the display control unit 28, the photographic subject region extracting process ends, and the process proceeds to step S13 of FIG. 8.

In the above manner, the image processing apparatus 11 generates a gradient map based on a photographic subject map, and specifies a photographic subject region based on a map obtained by performing threshold processing of the gradient map using two thresholds.

Generating a gradient map based on a photographic subject map and specifying a photographic subject region based on a map obtained by performing threshold processing of the gradient map using two thresholds in this manner allows more accurate specification of a region of a photographic subject in an image.

That is, since the pixel value of a pixel of the gradient map is regarded as a value that indicates the degree of change of a value that indicates the likeliness of being a photographic subject, as described above, a photographic subject region can be more certainly extracted from an image, compared with the photographic subject map.

Adding threshold maps obtained by performing threshold processing of the gradient map using two threshold values that are different in value and binarizing pixels of a map obtained as a result thereof in accordance with whether or not a specific condition is satisfied allows exclusion of a noise region and more accurate extraction of a region that should serve as a photographic subject.

The series of processes described above may be executed by hardware or may be executed by software. In the case where the series of processes is to be executed by software, a program constituting the software is installed from a program recording medium into a computer incorporated in dedicated hardware or, for example, a general-purpose personal computer that can perform various functions when various programs are installed therein.

Figure 21:
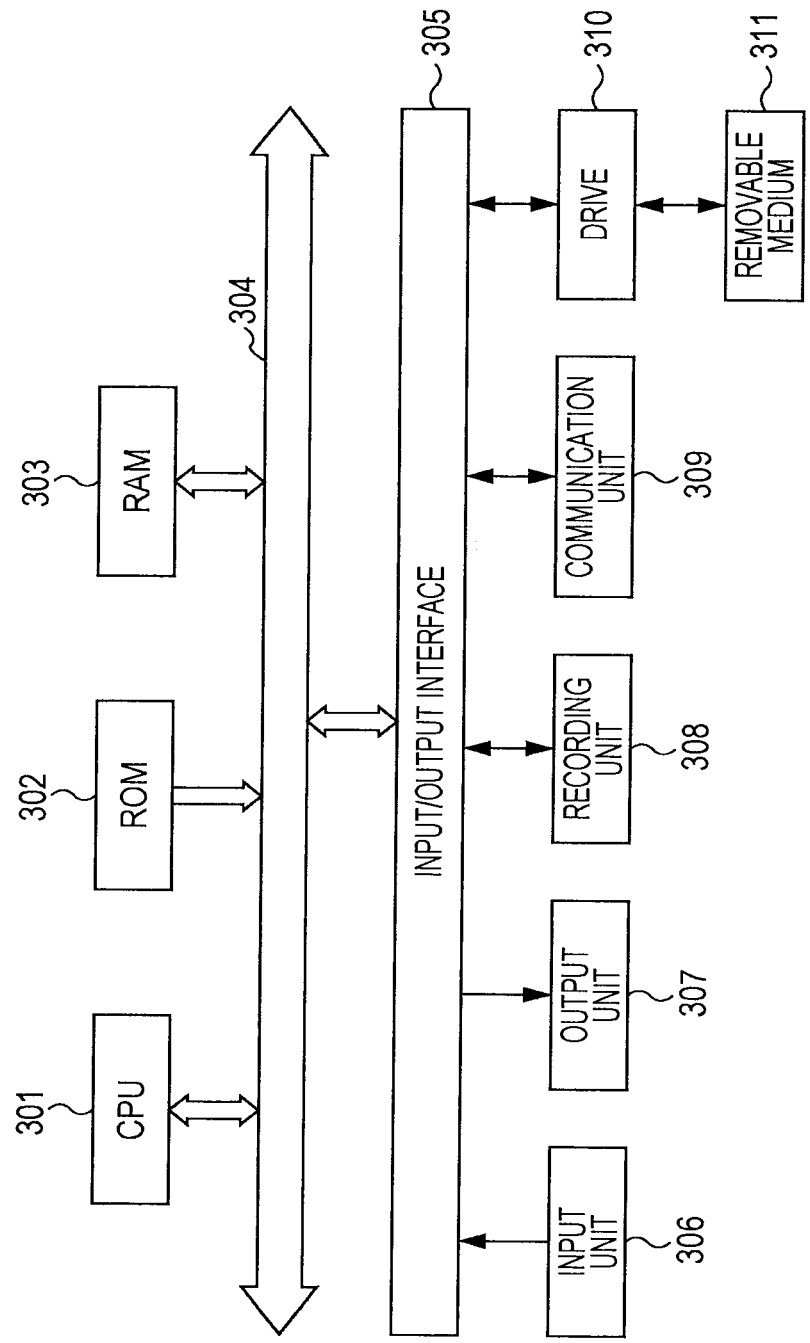
FIG. 21 is a diagram illustrating an example of the configuration of a computer.

FIG. 21 is a block diagram illustrating an example of the configuration of hardware of a computer that executes the series of processes described above in accordance with a program.

In the computer, a CPU (Central Processing Unit) 301, a ROM (Read Only Memory) 302, and a RAM (Random Access Memory) 303 are connected to one another via a bus 304.

An input/output interface 305 is further connected to the bus 304. An input unit 306 including a keyboard, a mouse, a microphone, and the like, an output unit 307 including a display, a loudspeaker, and the like, a recording unit 308 including a hard disk, a non-volatile memory, and the like, a communication unit 309 including a network interface and the like, and a drive 310 that drives a removable medium 311 such as a magnetic disk, an optical disk, a magneto-optical disk, or a semiconductor memory are connected to the input/output interface 305.

In the computer constructed as above, for example, the CPU 301 loads a program recorded in the recording unit 308 into the RAM 303 via the input/output interface 305 and the bus 304, and executes the program, thereby performing the series of processes described above.

The program executed by the computer (CPU 301) is recorded on, for example, the removable medium 311 which is a packaged medium including a magnetic disk (including a flexible disk), an optical disk (CD-ROM (Compact Disc-Read Only Memory), DVD (Digital Versatile Disc), or the like), a magneto-optical disk, a semiconductor memory, or the like, or is provided via a wired or wireless transmission medium such as a local area network, the Internet, or digital satellite broadcasting.

The program can be installed in the recording medium 308 via the input/output interface 305 by mounting the removable medium 311 to the drive 310. Also, the program can be received at the communication unit 309 via a wired or wireless transmission medium, and can be installed in the recording medium 308. Alternatively, the program can be installed in advance in the ROM 302 or the recording medium 308.

Note that the program executed by the computer may be a program with which processes are executed time-sequentially in accordance with the order described in the present description, but also be a program with which processes are executed in parallel or at necessary timings such as when called.

Note that embodiments of the present invention are not to be limited to the embodiment described above, and various changes can be made without departing from the gist of the present invention.

REFERENCE SIGNS LIST 11 image processing apparatus, 21 photographic subject map generating unit, 22 gradient map generating unit, 23 threshold processing unit, 24 threshold processing unit, 25 composite map generating unit, 26 binarized map generating unit, 27 rectangle shaping unit, 28 display control unit

The invention claimed is:

1. An image processing apparatus comprising:
   photographic subject map generating means for extracting, from an input image, a feature quantity of a feature included in a region of a photographic subject in the input image, and generating a photographic subject map that indicates the likeliness of each region of the input image being a region of the photographic subject;
   first threshold processing means for binarizing the photographic subject map by performing threshold processing using a first threshold, and generating a first threshold map for specifying a connected region including the photographic subject;
   second threshold processing means for binarizing the photographic subject map by performing threshold processing using a second threshold, and generating a second threshold map for specifying a region that is in the connected region specified based on the first threshold map and that is likely to be the photographic subject;
   composite map generating means for generating a composite map for specifying a region of the photographic subject in the input image by regarding that, in one or a plurality of connected regions specified based on the first threshold map, the connected region including the region specified, based on the second threshold map, as the region that is likely to be the photographic subject is a region of the photographic subject;
   wherein the composite map is information in which binary information indicating whether each region of the input image is a region of the photographic subject is arranged corresponding to each region of the input image; and
   photographic subject specifying information generating means for generating photographic subject specifying information that specifies a region of the photographic subject in the input image by obtaining an AND of the composite map and the photographic subject map and binarizing an arithmetic result of the AND by performing threshold processing using a third threshold.

2. The image processing apparatus according to claim 1, wherein the composite map generating means generates the composite map by regarding that, in the connected region including the region specified, based on the second threshold map, as the region that is likely to be the photographic subject, the connected region having a predetermined area or greater is a region of the photographic subject.

3. The image processing apparatus according to claim 1, wherein the photographic subject specifying information generating means obtains the third threshold, in the arithmetic result of the AND, based on the photographic subject map, for each region that is the same as a photographic subject region specified, based on the composite map, as a region of the photographic subject.

4. The image processing apparatus according to claim 1, further comprising:
   gradient map generating means for generating, based on the photographic subject map, a gradient map indicating the degree of change of the likeliness of each region of the input image being a region of the photographic subject indicated by the photographic subject map,
   wherein the first threshold processing means and the second threshold processing means perform threshold processing of the gradient map, and generate the first threshold map and the second threshold map.

5. The image processing apparatus according to claim 4, wherein the first threshold processing means and the second threshold processing means calculate the first threshold and the second threshold based on the gradient map.

6. The image processing apparatus according to claim 1, wherein the photographic subject map generating means comprises a luminance information extracting unit, a color information extracting unit, an edge information extracting unit, a face information extracting unit, a movement information extracting unit, and a map generating unit.

7. An image processing method for an image processing apparatus including:
photographic subject map generating means for extracting, from an input image, a feature quantity of a feature included in a region of a photographic subject in the input image, and generating a photographic subject map that indicates the likeliness of each region of the input image being a region of the photographic subject;
first threshold processing means for binarizing the photographic subject map by performing threshold processing using a first, threshold, and generating a first threshold map for specifying a connected region including the photographic subject;
second threshold processing means for binarizing the photographic subject map by performing threshold processing using a second threshold, and generating a second threshold map for specifying a region that is in the connected region specified based on the first threshold map and that is likely to be the photographic subject;
composite map generating means for generating a composite map for specifying a region of the photographic subject in the input image by regarding that, in one or a plurality of connected regions specified based on the first threshold map, the connected region including the region specified, based on the second threshold map, as the region that is likely to be the photographic subject is a region of the photographic subject; and
photographic subject specifying information generating means for generating photographic subject specifying information that specifies a region of the photographic subject in the input image by obtaining an AND of the composite map and the photographic subject map and binarizing an arithmetic result of the AND by performing threshold processing using a third threshold,
the image processing method comprising the steps of:
generating, by the photographic subject map generating means, the photographic subject map based on the input image,
generating, by the first threshold processing means, the first threshold map by performing threshold processing using the first threshold;
generating, by the second threshold processing means, the second threshold map by performing threshold processing using the second threshold;
generating, by the composite map generating means, the composite map based on the first threshold map and the second threshold map; and
generating, by the photographic subject generating means, photographic subject specifying information that specifies a region of the photographic subject in the input image by obtaining an AND of the composite map and the photographic subject map and binarizing an arithmetic result of the AND by performing threshold processing using a third threshold.

8. The image processing method for an image processing apparatus according to claim 7, wherein the composite map generating means generates the composite map by regarding that, in the connected region including the region specified, based on the second threshold map, as the region that is likely to be the photographic subject, the connected region having a predetermined area or greater is a region of the photographic subject.

9. The image processing method for an image processing apparatus according to claim 7, wherein the photographic subject specifying information generating means obtains the third threshold, in the arithmetic result of the AND, based on the photographic subject map, for each region that is the same as a photographic subject region specified, based on the composite map, as a region of the photographic subject.

10. The image processing method for an image processing apparatus according to claim 7 further including:
gradient map generating means for generating, based on the photographic subject map, a gradient map indicating the degree of change of the likeliness of each region of the input image being a region of the photographic subject indicated by the photographic subject map,
the image processing method further comprising the step of:
performing, with the first threshold processing means and the second threshold processing means, threshold processing of the gradient map, and generating the first threshold map acid the second threshold map.

11. The image processing method for an image processing apparatus according to claim 10, wherein the first threshold processing means and the second threshold processing means calculate the first threshold and the second threshold based on the gradient map.

12. A program on non-transitory computer-readable medium that causes a computer to execute a process comprising the steps of:
extracting, from an input image, a feature quantity of a feature included in a region of a photographic subject in the input image, and generating a photographic subject map that indicates the likeliness of each region of the input image being a region of the photographic subject;
binarizing the photographic subject map by performing threshold processing using a first threshold, and generating a first threshold map for specifying a connected region including the photographic subject;
binarizing the photographic subject map by performing threshold processing using a second threshold, and generating a second threshold map for specifying a region that is in the connected region specified based on the first threshold map and that is likely to be the photographic subject;
generating a composite map for specifying a region of the photographic subject in the input image by regarding that, in one or a plurality of connected regions specified based on the first threshold map, the connected region including the region specified, based on the second threshold map, as the region that is likely to be the photographic subject is a region of the photographic subject; and
generating photographic subject specifying information that specifies a region of the photographic subject in the input image by obtaining an AND of the composite map and the photographic subject map and binarizing an arithmetic result of the AND by performing threshold processing using a third threshold.

13. A program on non-transitory computer-readable medium that causes a computer to execute a process according to claim 12, wherein the composite map generating means generates the composite map by regarding that, in the connected region including the region specified, based on the second threshold map, as the region that is likely to be the photographic subject, the connected region having a predetermined area or greater is a region of the photographic subject.

14. A program on non-transitory computer-readable medium that causes a computer to execute a process according to claim 12, wherein the photographic subject specifying information generating means obtains the third threshold, is the arithmetic result of the AND, based on the photographic subject map, for each region that is the same as a photographic subject region specified, based on the composite map, as a region of the photographic subject.

15. A program on non-transitory computer-readable medium that causes a computer to execute a process according to claim 12 further including:
  generating a gradient map, based on the photographic subject map, indicating the degree of change of the likeliness of each region of the input image being a region of the photographic subject indicated by the photographic subject map,
  wherein the first threshold processing means and the second threshold processing means perform threshold processing of the gradient map, and generate the first threshold map and the second threshold map.

16. A program on non-transitory computer-readable medium that causes a computer to execute a process according to claim 15, wherein the first threshold processing means and the second threshold processing means calculate the first threshold and the second threshold based on the gradient map.

* * * * *